US 6,701,453 B2

(12) United States Patent
Chrabaszcz

(10) Patent No.: US 6,701,453 B2
(45) Date of Patent: Mar. 2, 2004

(54) SYSTEM FOR CLUSTERING SOFTWARE APPLICATIONS

(75) Inventor: Michael Chrabaszcz, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 32 days.

(21) Appl. No.: 09/879,587

(22) Filed: Jun. 11, 2001

(65) Prior Publication Data

US 2001/0056554 A1 Dec. 27, 2001

Related U.S. Application Data

(62) Division of application No. 08/942,411, filed on Oct. 1, 1997, now Pat. No. 6,363,497.
(60) Provisional application No. 60/046,327, filed on May 13, 1997.

(51) Int. Cl.[7] .............................................. G06F 11/00
(52) U.S. Cl. ...................................................... 714/13
(58) Field of Search ............................... 714/13, 10, 4, 714/3, 2, 17, 16, 20, 11; 717/2, 3, 4, 5, 11; 709/201

(56) References Cited

U.S. PATENT DOCUMENTS

| 4,057,847 A | 11/1977 | Lowell et al. ............... 364/200 |
| 4,100,597 A | 7/1978 | Fleming et al. ............. 364/474 |
| 4,449,182 A | 5/1984 | Rubinson et al. ........... 364/200 |
| 4,672,535 A | 6/1987 | Katzman et al. ............ 364/200 |
| 4,692,918 A | 9/1987 | Elliott et al. .................... 370/85 |
| 4,695,946 A | 9/1987 | Andreasen et al. ......... 364/200 |
| 4,707,803 A | 11/1987 | Anthony, Jr. et al. ....... 364/900 |
| 4,769,764 A | 9/1988 | Levanon ...................... 364/708 |
| 4,774,502 A | 9/1988 | Kimura ........................ 340/501 |
| 4,821,180 A | 4/1989 | Gerety et al. ............... 364/200 |
| 4,835,737 A | 5/1989 | Herrig et al. ................ 364/900 |
| 4,894,792 A | 1/1990 | Mitchell et al. ............. 364/708 |
| 4,949,245 A | 8/1990 | Martin et al. ................ 364/200 |
| 4,999,787 A | 3/1991 | McNally et al. ............. 364/514 |

(List continued on next page.)

FOREIGN PATENT DOCUMENTS

| EP | 0 866 403 A1 | 9/1998 | ........... G06F/13/10 |
| JP | 04 333 118 A | 11/1992 | ............. G06F/1/18 |
| JP | 0 5233 110 A | 9/1993 | ............. G06F/3/00 |
| JP | 07 093 064 A | 4/1995 | ............. G06F/1/26 |
| JP | 07 261 874 A | 10/1995 | ............. G06F/1/18 |

OTHER PUBLICATIONS

Cmasters, Usenet post to microsoft.public.windowsnt.setup, Aug. 1997, "Re: FDISK switches."

(List continued on next page.)

*Primary Examiner*—James P. Trammell
*Assistant Examiner*—Pierre E Elisca
(74) *Attorney, Agent, or Firm*—Knobbe, Martens, Olson & Bear, LLP

(57) ABSTRACT

A system for fault tolerant execution of an application program in a server network, which includes: a first server for executing the application program; a cluster network database, coupled to the first server; an object, stored in the cluster network database, which represents the program and contains information pertaining to the program; a failure detection module which detects a failure of the first server; a second server, coupled to the cluster network database; and a failover module which loads the application program in the second server upon detection of the failure of the first server. The information contained within the object includes: a host server attribute which identifies which server is currently executing the program; a primary server attribute which identifies which server is primarily responsible for executing the program; and a backup server attribute which identifies which server is a backup server for executing the program if the primary server experiences a failure.

13 Claims, 20 Drawing Sheets

U.S. PATENT DOCUMENTS

| | | | |
|---|---|---|---|
| 5,006,961 A | 4/1991 | Monico | 361/413 |
| 5,007,431 A | 4/1991 | Donehoo, III | 128/696 |
| 5,033,048 A | 7/1991 | Pierce et al. | 371/21.2 |
| 5,051,720 A | 9/1991 | Kittirutsunetorn | 340/310 R |
| 5,073,932 A | 12/1991 | Yossifor et al. | 380/23 |
| 5,103,391 A | 4/1992 | Barrett | 364/133 |
| 5,118,970 A | 6/1992 | Olson et al. | 307/443 |
| 5,121,500 A | 6/1992 | Arlington et al. | 395/750 |
| 5,136,708 A | 8/1992 | Lapourtre et al. | 395/650 |
| 5,136,715 A | 8/1992 | Hirose et al. | 395/775 |
| 5,138,619 A | 8/1992 | Fasang et al. | 371/21.1 |
| 5,157,663 A | 10/1992 | Major et al. | 371/9.1 |
| 5,210,855 A | 5/1993 | Bartol | 395/500 |
| 5,222,897 A | 6/1993 | Collins et al. | 439/157 |
| 5,245,615 A | 9/1993 | Treu | 371/16.5 |
| 5,247,683 A | 9/1993 | Holmes et al. | 395/700 |
| 5,253,348 A | 10/1993 | Scalise | 395/325 |
| 5,265,098 A | 11/1993 | Mattson et al. | 371/11.1 |
| 5,266,838 A | 11/1993 | Gerner | 307/19 |
| 5,269,011 A | 12/1993 | Yanai et al. | 395/425 |
| 5,272,382 A | 12/1993 | Heald et al. | 307/66 |
| 5,272,584 A | 12/1993 | Austruy et al. | 361/58 |
| 5,276,814 A | 1/1994 | Bourke et al. | 395/275 |
| 5,276,863 A | 1/1994 | Heider | 395/575 |
| 5,277,615 A | 1/1994 | Hastings et al. | 439/377 |
| 5,280,621 A | 1/1994 | Barnes et al. | 395/800 |
| 5,283,905 A | 2/1994 | Saadeh et al. | 395/750 |
| 5,307,354 A | 4/1994 | Cramer et al. | 371/11.2 |
| 5,311,397 A | 5/1994 | Harshberger et al. | 361/683 |
| 5,311,451 A | 5/1994 | Barrett | 364/550 |
| 5,317,693 A | 5/1994 | Cuenod et al. | 395/275 |
| 5,329,625 A | 7/1994 | Kannan et al. | 395/275 |
| 5,337,413 A | 8/1994 | Lui et al. | 395/275 |
| 5,351,276 A | 9/1994 | Doll, Jr. et al. | 379/67 |
| 5,367,670 A | 11/1994 | Ward et al. | 395/575 |
| 5,379,184 A | 1/1995 | Barraza et al. | 361/685 |
| 5,386,567 A | 1/1995 | Lien et al. | 395/700 |
| 5,388,267 A | 2/1995 | Chan et al. | 395/700 |
| 5,402,431 A | 3/1995 | Saadeh et al. | 371/67.1 |
| 5,404,494 A | 4/1995 | Garney | 395/500 |
| 5,422,826 A | 6/1995 | Cousineau | |
| 5,423,025 A | 6/1995 | Goldman et al. | 395/575 |
| 5,430,717 A | 7/1995 | Fowler et al. | 370/58.2 |
| 5,430,845 A | 7/1995 | Rimmer et al. | 395/275 |
| 5,432,715 A | 7/1995 | Shigematsu et al. | 364/551.01 |
| 5,432,946 A | 7/1995 | Allard et al. | 395/750 |
| 5,438,678 A | 8/1995 | Smith | 395/750 |
| 5,440,748 A | 8/1995 | Sekine et al. | 395/750 |
| 5,448,723 A | 9/1995 | Rowett | 395/200.02 |
| 5,455,933 A | 10/1995 | Schieve et al. | 395/183.03 |
| 5,460,441 A | 10/1995 | Hastings et al. | 312/298 |
| 5,463,766 A | 10/1995 | Schieve et al. | 395/650 |
| 5,465,349 A | 11/1995 | Geronimi et al. | 364/550 |
| 5,471,634 A | 11/1995 | Giorgio et al. | 395/600 |
| 5,473,499 A | 12/1995 | Weir | 361/58 |
| 5,483,419 A | 1/1996 | Kaczeus, Sr. et al. | 361/685 |
| 5,485,550 A | 1/1996 | Dalton | 395/51 |
| 5,487,148 A | 1/1996 | Komori et al. | 395/182.02 |
| 5,491,791 A | 2/1996 | Glowny et al. | 395/183.13 |
| 5,493,574 A | 2/1996 | McKinley | 371/40.1 |
| 5,493,666 A | 2/1996 | Fitch | 395/445 |
| 5,506,960 A | 4/1996 | Meare | 395/183.21 |
| 5,513,314 A | 4/1996 | Kandasamy et al. | 395/182.04 |
| 5,513,339 A | 4/1996 | Agrawal et al. | 395/500 |
| 5,515,515 A | 5/1996 | Kennedy et al. | 395/283 |
| 5,517,646 A | 5/1996 | Piccirillo et al. | 395/700 |
| 5,519,851 A | 5/1996 | Bender et al. | 395/500 |
| 5,526,289 A | 6/1996 | Dinh et al. | 364/557 |
| 5,528,409 A | 6/1996 | Cucci et al. | 359/171 |
| 5,530,810 A | 6/1996 | Bowman | 395/283 |
| 5,533,193 A | 7/1996 | Roscoe | 395/183.15 |
| 5,533,198 A | 7/1996 | Thorson | 395/200.15 |
| 5,535,326 A | 7/1996 | Baskey et al. | 395/182.02 |
| 5,539,883 A | 7/1996 | Allon et al. | 395/200.11 |
| 5,542,055 A | 7/1996 | Amini et al. | 395/281 |
| 5,546,272 A | 8/1996 | Moss et al. | 361/687 |
| 5,548,712 A | 8/1996 | Larson et al. | 395/182.05 |
| 5,555,510 A | 9/1996 | Verseput et al. | 364/514 R |
| 5,559,764 A | 9/1996 | Chen et al. | 369/30 |
| 5,559,958 A | 9/1996 | Farrand et al. | 395/183.03 |
| 5,559,965 A | 9/1996 | Oztaskin et al. | 395/284 |
| 5,560,022 A | 9/1996 | Dunstan et al. | 395/750 |
| 5,564,024 A | 10/1996 | Pemberton | 395/283 |
| 5,566,299 A | 10/1996 | Billings et al. | 395/182.02 |
| 5,566,339 A | 10/1996 | Perholtz et al. | 395/750 |
| 5,568,610 A | 10/1996 | Brown | 395/185.01 |
| 5,568,619 A | 10/1996 | Blackledge et al. | 395/281 |
| 5,572,403 A | 11/1996 | Mills | 361/695 |
| 5,577,205 A | 11/1996 | Hwang et al. | 395/200.01 |
| 5,579,487 A | 11/1996 | Meyerson et al. | 395/280 |
| 5,579,491 A | 11/1996 | Jeffries et al. | 395/283 |
| 5,579,528 A | 11/1996 | Register | 395/671 |
| 5,581,712 A | 12/1996 | Herrman | 395/283 |
| 5,581,714 A | 12/1996 | Amini et al. | 395/308 |
| 5,584,030 A | 12/1996 | Husak et al. | 395/750 |
| 5,586,250 A | 12/1996 | Carbonneau et al. | 395/183.2 |
| 5,586,271 A | 12/1996 | Parrell | 395/283 |
| 5,588,121 A | 12/1996 | Reddin et al. | 395/200.15 |
| 5,588,144 A | 12/1996 | Inoue et al. | 395/555 |
| 5,592,610 A | 1/1997 | Chittor | 395/182.02 |
| 5,592,611 A | 1/1997 | Midgely et al. | 395/182.02 |
| 5,596,711 A | 1/1997 | Burckhartt et al. | 395/182.21 |
| 5,598,407 A | 1/1997 | Bud et al. | 370/330 |
| 5,602,758 A | 2/1997 | Lincoln et al. | 364/505 |
| 5,606,672 A | 2/1997 | Wade | 395/308 |
| 5,608,865 A | 3/1997 | Midgely et al. | 395/180 |
| 5,608,876 A | 3/1997 | Cohen et al. | 395/281 |
| 5,615,207 A | 3/1997 | Gephardt et al. | 370/237 |
| 5,621,159 A | 4/1997 | Brown et al. | 73/9 |
| 5,622,221 A | 4/1997 | Genga, Jr. et al. | 165/208 |
| 5,625,238 A | 4/1997 | Ady et al. | 307/147 |
| 5,627,962 A | 5/1997 | Goodrum et al. | 395/182.11 |
| 5,628,028 A | 5/1997 | Michelson | 395/825 |
| 5,630,076 A | 5/1997 | Saulpaugh et al. | 395/284 |
| 5,631,847 A | 5/1997 | Kikinis | 364/514 R |
| 5,632,021 A | 5/1997 | Jennings et al. | 395/309 |
| 5,636,341 A | 6/1997 | Matsushita et al. | 395/182.11 |
| 5,638,289 A | 6/1997 | Yamada et al. | 364/489 |
| 5,644,470 A | 7/1997 | Benedict et al. | 361/686 |
| 5,644,731 A | 7/1997 | Liencres et al. | 395/283 |
| 5,651,006 A | 7/1997 | Fujino et al. | 370/408 |
| 5,652,832 A | 7/1997 | Kane et al. | 395/181 |
| 5,652,833 A | 7/1997 | Takizawa et al. | 395/182.08 |
| 5,652,839 A | 7/1997 | Giorgio et al. | 395/200.11 |
| 5,652,892 A | 7/1997 | Ugajin | 395/750 |
| 5,652,908 A | 7/1997 | Douglas et al. | 395/800 |
| 5,655,081 A | 8/1997 | Bonnell et al. | 395/200.32 |
| 5,655,083 A | 8/1997 | Bagley | 395/182.31 |
| 5,655,148 A | 8/1997 | Richman et al. | 395/828 |
| 5,659,682 A | 8/1997 | Devarakonda et al. | 395/184.01 |
| 5,664,118 A | 9/1997 | Nishigaki et al. | 395/283 |
| 5,664,119 A | 9/1997 | Jeffries et al. | 395/283 |
| 5,666,538 A | 9/1997 | DeNicola | 395/750.03 |
| 5,668,943 A | 9/1997 | Attanasio et al. | 395/182.05 |
| 5,668,992 A | 9/1997 | Hammer et al. | 395/651 |
| 5,669,009 A | 9/1997 | Buktenica et al. | 395/800.35 |
| 5,671,371 A | 9/1997 | Kondo et al. | 395/306 |
| 5,675,723 A | 10/1997 | Ekrot et al. | 395/182.02 |
| 5,680,288 A | 10/1997 | Carey et al. | 361/118 |
| 5,682,328 A | 10/1997 | Roeber et al. | 364/550 |
| 5,684,671 A | 11/1997 | Hobbs et al. | 361/683 |

| Patent No. | Date | Inventor | Class |
|---|---|---|---|
| 5,689,637 A | 11/1997 | Johnson et al. | 395/183.22 |
| 5,696,895 A | 12/1997 | Hemphill et al. | 395/182.02 |
| 5,696,899 A | 12/1997 | Kalwitz | 395/200.1 |
| 5,696,949 A | 12/1997 | Young | 395/551 |
| 5,696,970 A | 12/1997 | Sandage et al. | 395/681 |
| 5,701,417 A | 12/1997 | Lewis et al. | 395/200.16 |
| 5,704,031 A | 12/1997 | Mikami et al. | 395/182.02 |
| 5,708,775 A | 1/1998 | Nakamura | 395/185.01 |
| 5,708,776 A | 1/1998 | Kikinis | 395/185.08 |
| 5,712,754 A | 1/1998 | Sides et al. | 361/58 |
| 5,715,456 A | 2/1998 | Bennett et al. | 395/652 |
| 5,717,570 A | 2/1998 | Kikinis | 361/685 |
| 5,721,935 A | 2/1998 | DeSchepper et al. | 395/750 |
| 5,724,529 A | 3/1998 | Smith et al. | 395/309 |
| 5,726,506 A | 3/1998 | Wood | 307/147 |
| 5,727,207 A | 3/1998 | Gates et al. | 395/651 |
| 5,732,266 A | 3/1998 | Moore et al. | 395/651 |
| 5,737,708 A | 4/1998 | Grob et al. | 455/557 |
| 5,737,747 A | 4/1998 | Vishlitzky et al. | 711/283 |
| 5,740,378 A | 4/1998 | Rehl et al. | 395/283 |
| 5,742,514 A | 4/1998 | Bonola | 364/492 |
| 5,742,833 A | 4/1998 | Dea et al. | 395/750.05 |
| 5,747,889 A | 5/1998 | Raynham et al. | 307/80 |
| 5,748,426 A | 5/1998 | Bedingfield et al. | 361/58 |
| 5,752,164 A | 5/1998 | Jones | 455/33.1 |
| 5,754,396 A | 5/1998 | Felcman et al. | 361/683 |
| 5,754,449 A | 5/1998 | Hoshal et al. | 364/550 |
| 5,754,797 A | 5/1998 | Takahashi | 395/283 |
| 5,758,165 A | 5/1998 | Shuff | 395/712 |
| 5,758,352 A | 5/1998 | Reynolds et al. | 707/200 |
| 5,761,033 A | 6/1998 | Wilhelm | 361/686 |
| 5,761,045 A | 6/1998 | Olson et al. | 361/726 |
| 5,761,085 A | 6/1998 | Giorgio | 364/505 |
| 5,761,462 A | 6/1998 | Neal et al. | 395/309 |
| 5,761,707 A | 6/1998 | Aiken et al. | 711/118 |
| 5,764,924 A | 6/1998 | Hong | 395/281 |
| 5,764,968 A | 6/1998 | Ninomiya | 395/560 |
| 5,765,008 A | 6/1998 | Desai et al. | 395/800 |
| 5,765,198 A | 6/1998 | McCrocklin et al. | 711/165 |
| 5,767,844 A | 6/1998 | Stoye | 345/212 |
| 5,768,541 A | 6/1998 | Pan-Ratzlaff | 395/283 |
| 5,768,542 A | 6/1998 | Enstrom et al. | 395/284 |
| 5,771,343 A | 6/1998 | Hafner et al. | 395/182.02 |
| 5,774,640 A | 6/1998 | Kurio | 395/182.02 |
| 5,774,645 A | 6/1998 | Beaujard et al. | 395/183.01 |
| 5,774,741 A | 6/1998 | Choi | 395/822 |
| 5,777,897 A | 7/1998 | Giorgio | 364/557 |
| 5,778,197 A | 7/1998 | Dunham | 395/284 |
| 5,781,703 A | 7/1998 | Desai et al. | 395/54 |
| 5,781,716 A | 7/1998 | Hemphill et al. | 395/182.02 |
| 5,781,744 A | 7/1998 | Johnson et al. | 395/283 |
| 5,781,746 A | 7/1998 | Fleck | 710/306 |
| 5,781,767 A | 7/1998 | Inoue et al. | 395/555 |
| 5,781,798 A | 7/1998 | Beatty et al. | 395/830 |
| 5,784,555 A | 7/1998 | Stone | 395/200.5 |
| 5,784,576 A | 7/1998 | Guthrie et al. | 395/283 |
| 5,787,019 A | 7/1998 | Knight et al. | 364/550 |
| 5,787,459 A | 7/1998 | Stallmo et al. | 711/112 |
| 5,787,491 A | 7/1998 | Merkin et al. | 711/173 |
| 5,790,775 A | 8/1998 | Marks et al. | 395/182.07 |
| 5,790,831 A | 8/1998 | Lin et al. | 395/500 |
| 5,793,948 A | 8/1998 | Asahi et al. | 395/184.01 |
| 5,793,987 A | 8/1998 | Quackenbush et al. | 395/280 |
| 5,794,035 A | 8/1998 | Golub et al. | 395/674 |
| 5,796,185 A | 8/1998 | Takata et al. | 307/140 |
| 5,796,580 A | 8/1998 | Komatsu et al. | 361/687 |
| 5,796,934 A * | 8/1998 | Bhanot et al. | 395/182.02 |
| 5,796,981 A | 8/1998 | Abudayyeh et al. | 395/500 |
| 5,797,023 A | 8/1998 | Berman et al. | 395/750.06 |
| 5,798,828 A | 8/1998 | Thomas et al. | 356/141.3 |
| 5,799,036 A | 8/1998 | Staples | 375/222 |
| 5,799,196 A | 8/1998 | Flannery | 395/750.03 |
| 5,801,921 A | 9/1998 | Miller | 361/686 |
| 5,802,269 A | 9/1998 | Poisner et al. | 395/183.2 |
| 5,802,298 A | 9/1998 | Imai et al. | 395/200.47 |
| 5,802,305 A | 9/1998 | McKaughan et al. | 395/200.57 |
| 5,802,324 A | 9/1998 | Wunderlich et al. | 395/281 |
| 5,802,393 A | 9/1998 | Begun et al. | 395/830 |
| 5,802,552 A | 9/1998 | Fandrich et al. | 711/103 |
| 5,802,592 A | 9/1998 | Chess et al. | 711/164 |
| 5,803,357 A | 9/1998 | Lakin | 236/78 B |
| 5,805,804 A | 9/1998 | Laursen et al. | 395/200.02 |
| 5,805,834 A | 9/1998 | McKinley et al. | 395/283 |
| 5,809,224 A | 9/1998 | Schultz et al. | 395/182.05 |
| 5,809,256 A | 9/1998 | Najemy | 395/283 |
| 5,809,287 A | 9/1998 | Stupek, Jr. et al. | 395/500 |
| 5,809,311 A | 9/1998 | Jones | 395/750.01 |
| 5,809,555 A | 9/1998 | Hobson | 711/172 |
| 5,812,748 A | 9/1998 | Ohran et al. | 395/182.02 |
| 5,812,750 A | 9/1998 | Dev et al. | 395/182.02 |
| 5,812,757 A | 9/1998 | Okamoto et al. | 395/182.09 |
| 5,812,858 A | 9/1998 | Nookala et al. | 395/733 |
| 5,815,117 A | 9/1998 | Kolanek | 342/442 |
| 5,815,647 A | 9/1998 | Buckland et al. | 395/182.01 |
| 5,815,651 A | 9/1998 | Litt | 395/182.08 |
| 5,815,652 A | 9/1998 | Ote et al. | 395/183.07 |
| 5,821,596 A | 10/1998 | Miu et al. | 257/419 |
| 5,822,547 A | 10/1998 | Boesch et al. | 395/283 |
| 5,826,043 A | 10/1998 | Smith et al. | 395/281 |
| 5,829,046 A | 10/1998 | Tzelnic et al. | 711/162 |
| 5,835,719 A | 11/1998 | Gibson et al. | 395/200.51 |
| 5,835,738 A | 11/1998 | Blackledge, Jr. et al. | 395/307 |
| 5,838,932 A | 11/1998 | Alzien | 395/308 |
| 5,841,964 A | 11/1998 | Yamaguchi | 395/113.21 |
| 5,841,991 A | 11/1998 | Russell | 395/200.51 |
| 5,845,061 A | 12/1998 | Miyamoto et al. | 395/182.02 |
| 5,845,095 A | 12/1998 | Reed et al. | 395/283 |
| 5,850,546 A | 12/1998 | Kim | 395/651 |
| 5,852,720 A | 12/1998 | Gready et al. | 395/200.47 |
| 5,852,724 A | 12/1998 | Glenn, II et al. | 395/200.69 |
| 5,857,074 A | 1/1999 | Johnson | 395/200.47 |
| 5,857,102 A | 1/1999 | McChesney et al. | 395/653 |
| 5,864,653 A | 1/1999 | Tavellaei et al. | 315/181 |
| 5,864,654 A | 1/1999 | Marchant | 395/182.01 |
| 5,864,713 A | 1/1999 | Terry | 395/872 |
| 5,867,730 A | 2/1999 | Leyda | 395/830 |
| 5,875,307 A | 2/1999 | Ma et al. | 395/281 |
| 5,875,308 A | 2/1999 | Egan et al. | 395/283 |
| 5,875,310 A | 2/1999 | Buckland et al. | 395/306 |
| 5,878,237 A | 3/1999 | Olarig | 395/308 |
| 5,878,238 A | 3/1999 | Gan et al. | 395/308 |
| 5,881,311 A | 3/1999 | Woods | 395/824 |
| 5,884,027 A | 3/1999 | Garbus et al. | 395/200.8 |
| 5,884,049 A | 3/1999 | Atkinson | 395/281 |
| 5,886,424 A | 3/1999 | Kim | 307/64 |
| 5,889,965 A | 3/1999 | Wallach et al. | 395/283 |
| 5,892,898 A | 4/1999 | Fujii et al. | 395/185.1 |
| 5,892,915 A | 4/1999 | Duso et al. | 395/200.49 |
| 5,892,928 A | 4/1999 | Wallach et al. | 395/283 |
| 5,893,140 A | 4/1999 | Vahalia et al. | 711/118 |
| 5,898,846 A | 4/1999 | Kelly | 395/284 |
| 5,898,888 A | 4/1999 | Guthrie et al. | 395/308 |
| 5,905,867 A | 5/1999 | Giorgio | 395/200.54 |
| 5,907,672 A | 5/1999 | Matze et al. | 395/182.06 |
| 5,909,568 A | 6/1999 | Nason | 395/500 |
| 5,911,779 A | 6/1999 | Stallmo et al. | 714/6 |
| 5,913,034 A | 6/1999 | Malcolm | 395/200.53 |
| 5,922,060 A | 7/1999 | Goodrum | 710/103 |
| 5,930,358 A | 7/1999 | Rao | 380/4 |
| 5,935,262 A | 8/1999 | Barrett et al. | 714/46 |
| 5,936,960 A | 8/1999 | Stewart | 370/438 |
| 5,938,751 A | 8/1999 | Tavallaei et al. | 710/103 |

| | | | |
|---|---|---|---|
| 5,941,996 A | 8/1999 | Smith et al. | 714/47 |
| 5,964,855 A | 10/1999 | Bass et al. | 710/103 |
| 5,983,349 A | 11/1999 | Kodama et al. | 713/200 |
| 5,987,554 A | 11/1999 | Liu et al. | 710/129 |
| 5,987,621 A | 11/1999 | Duso et al. | 714/4 |
| 5,987,627 A | 11/1999 | Rawlings, III | 714/48 |
| 6,012,130 A | 1/2000 | Beyda et al. | 711/173 |
| 6,038,624 A | 3/2000 | Chan et al. | 710/103 |
| 6,170,028 B1 | 1/2001 | Wallach et al. | 710/103 |
| 6,173,346 B1 | 1/2001 | Wallach et al. | 710/103 |
| 6,179,486 B1 | 1/2001 | Wallach et al. | 395/283 |
| 6,189,109 B1 | 2/2001 | Sheikh et al. | 714/1 |
| 6,192,434 B1 | 2/2001 | Wallach et al. | 710/103 |
| 6,199,137 B1 | 3/2001 | Aguilar et al. | 710/129 |
| 6,219,734 B1 | 4/2001 | Wallach et al. | 710/103 |
| 6,247,080 B1 | 6/2001 | Wallach et al. | 710/103 |
| 6,304,929 B1 | 10/2001 | Wallach et al. | 710/103 |

OTHER PUBLICATIONS

Compaq Computer Corporation, Technology Brief, pp. 1–13, Dec. 1996, "Where Do I Plug the Cable? Solving the Logical–Physical Slot Numbering Problem."

Davis, T., Usenet post to alt.msdos.batch, Apr. 1997, "Re: Need help with automating FDISK and FORMAT . . . "

Davis, T, Usenet post to alt.msdos.programmer, Apr. 1997, "Re: How do I create an FDISK batch file?".

Gorlick, M., Conf. Proceedings: ACM/ONR Workshop on Parallel and Distributed Debugging, pp. 175–181, 1991, "The Flight Recorder: An Architectural Aid for System Monitoring."

Haban, D. & D. Wybranietz, *IEEE Transaction on Software Engineering*, 16(2):197–211, Feb. 1990, "A Hybrid Monitor for Behavior and Performance Analysis of Distributed Systems."

Hildebrand, N., Usenet post to comp.msdos.programmer, May 1995, "Re: Structure of disk partition into."

IBM Technical Disclosure Bulletin, 92A+62947, pp. 391–394, Oct. 1992, Method for Card Hot Plug Detection and Control.

Lewis, L., Usenet post to alt.msdos.batch, Apr. 1997, "Re: Need help with automating FDISK and FORMAT."

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

NetFRAME Systems Incorporated, *datasheet*, Mar. 1996, "NetFRAME Cluster Server 8000."

NetFRAME Systems Incorporated, Doc. No. 78–1000226–01, pp. 1–2, 5–8, 359–404, and 471–512, Apr. 1996, "NetFRAME Clustered Multiprocessing Software: NW0496 DC–ROM for Novel®4.1 SMP, 4.1, and 3.12."

Netframe, http://www.netframe-support.com/technology/datasheets/data.htm, before Mar. 1997, "Netframe Cluster-System 9008 Data Sheet."

NetFRAME Systems Incorporated, *News Release*, 3 pages, referring to May 9, 1994, "NetFRAME's New High–Availability ClusterServer Systems Avoid Scheduled as well as Unscheduled Downtime."

NetFRAME Systems Incorporated, *datasheet*, Feb. 1996, "NF450FT Network Mainframe."

PCI Hot–Plug Specification, Preliminary Revision for Review Only, Revision 0.9, pp. i–vi, and 1–25, Mar. 5, 1997.

Rigney, PC Magazine, 14(17): 375–379, Oct. 10, 1995, "The One for the Road (Mobile–aware capabilities in Windows 95)."

SES SCSI–3 Enclosure Services, X3T10/Project 1212–D/Rev 8a, pp. i, iii–x, 1–76, and I–1 (index), Jan. 16, 1997 .

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Shanley, and Anderson, PCI System Architecture, Third Edition, p. 382, Copyright 1995.

Simos, M., Usenet post to comp.os.msdos.misc, Apr. 1997, "Re: Auto FDISK and FORMAT."

Sun Microsystems, Part No. 802–6569–11, Release 1.0.1, Nov. 1996, "Remote Systems Diagnostics Installation & User Guide."

Sun Microsystems Computer Company, Part No. 802–5355–10, Rev. A, May 1996, "Solstice SyMON User's Guid."

Wood, M. H., Usenet Post to comp.os.netware.misc, Aug. 1996, "Re: Workstation duplication method for WIN95."

ftp.cdrom.com/pub/os2/diskutil/, PHDX software, phdx.zip download, Mar. 1995, "Parallel Hard Disk Xfer."

* cited by examiner

| TAG | CA-1 |
|---|---|
| TYPE | CLUSTER CAPABLE |
| COMMAND | D |
| HOST SERVER | 102 |
| PRIMARY SERVER | 102 |
| BACKUP SERVER | 104 |
| RESOURCE LIST | D |

410

| TAG | CA-1 |
|---|---|
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

| TAG | CA-1 |
|---|---|
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

410

| TAG | CA-1 |
|---|---|
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

| TAG | CA-1 |
|---|---|
| TYPE | CLUSTER CAPABLE |
| COMMAND | D |
| HOST SERVER | 102 |
| PRIMARY SERVER | 102 |
| BACKUP SERVER | 104 |
| RESOURCE LIST | D |

410

| TAG | CA-1 |
|---|---|
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

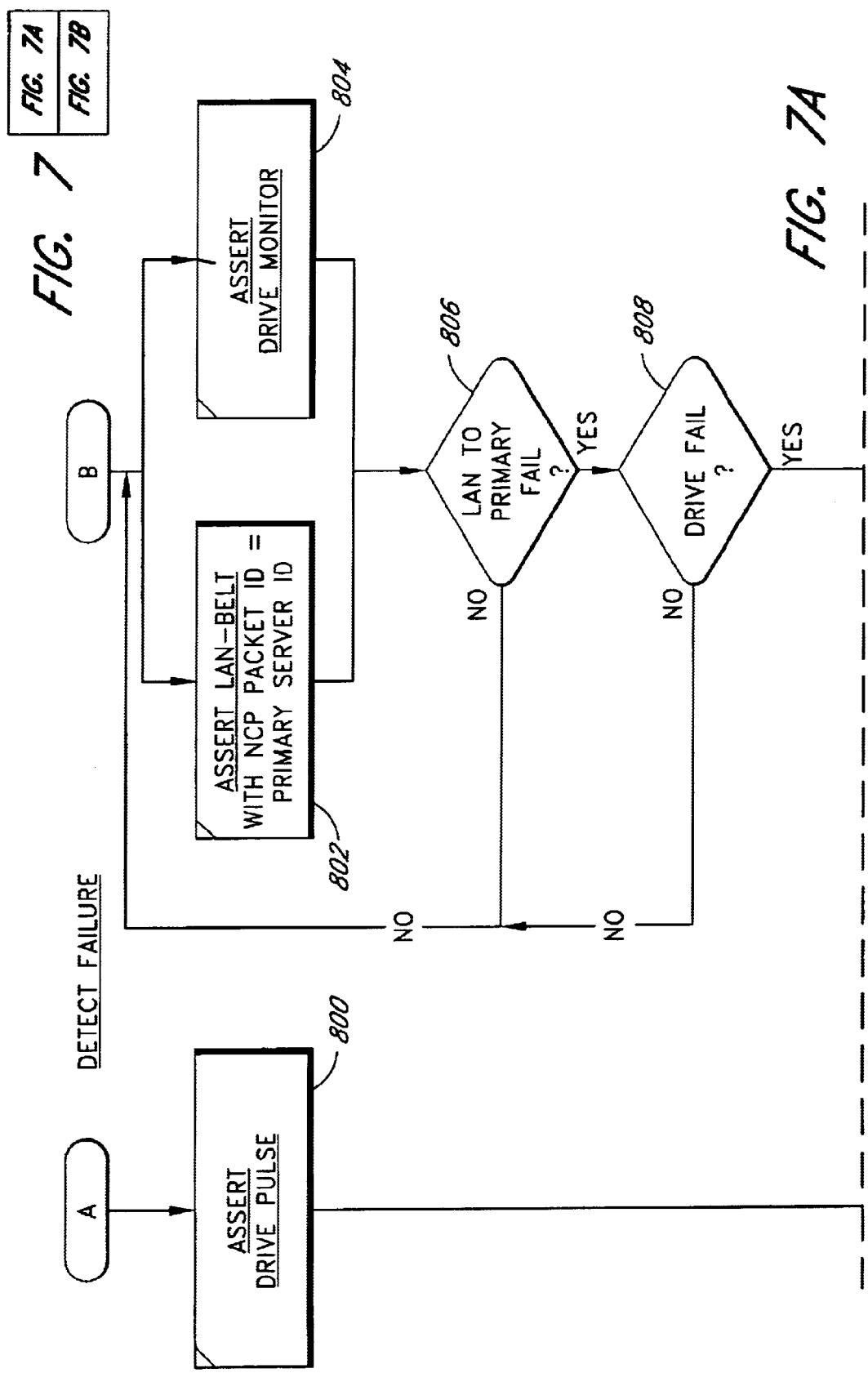

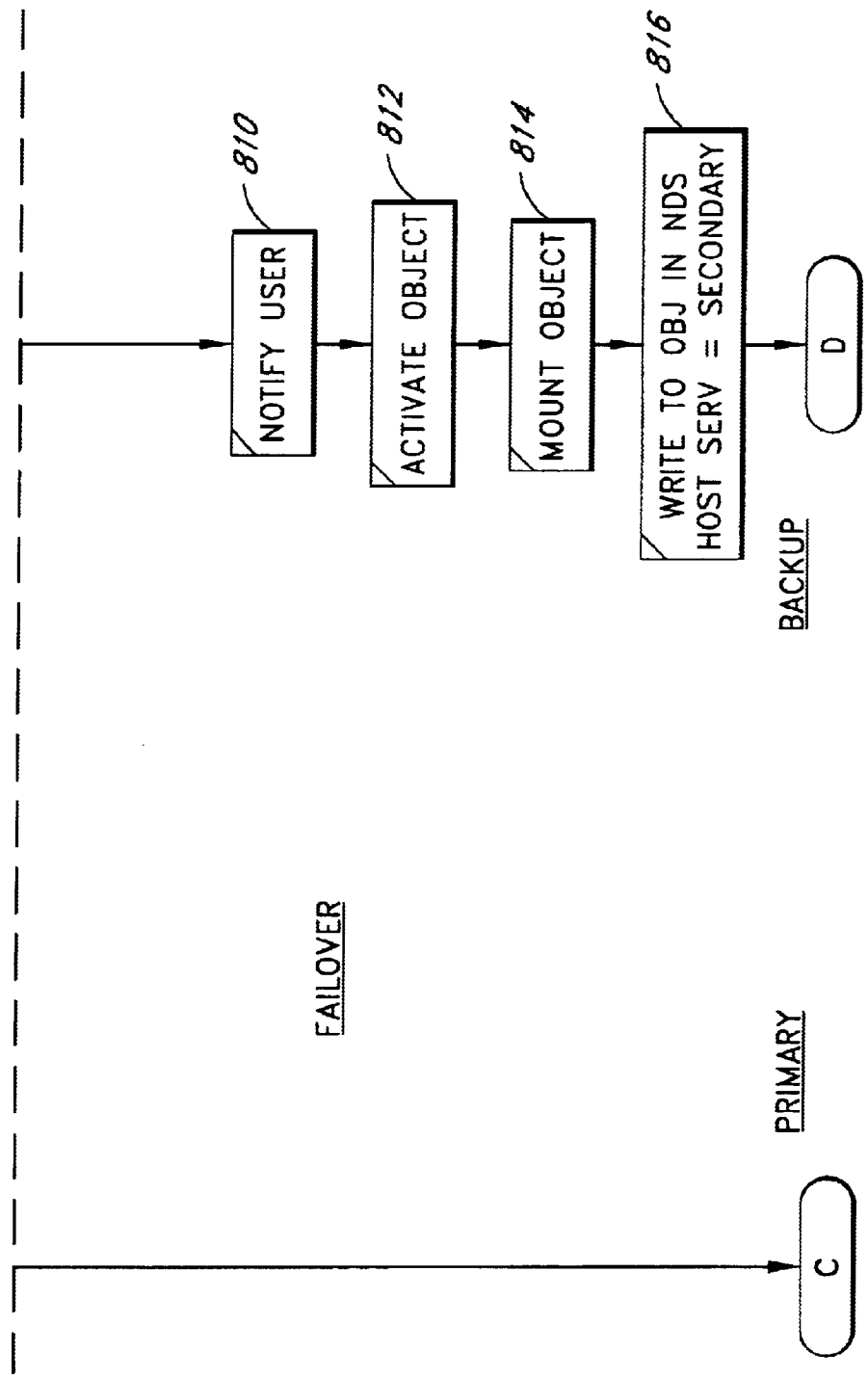

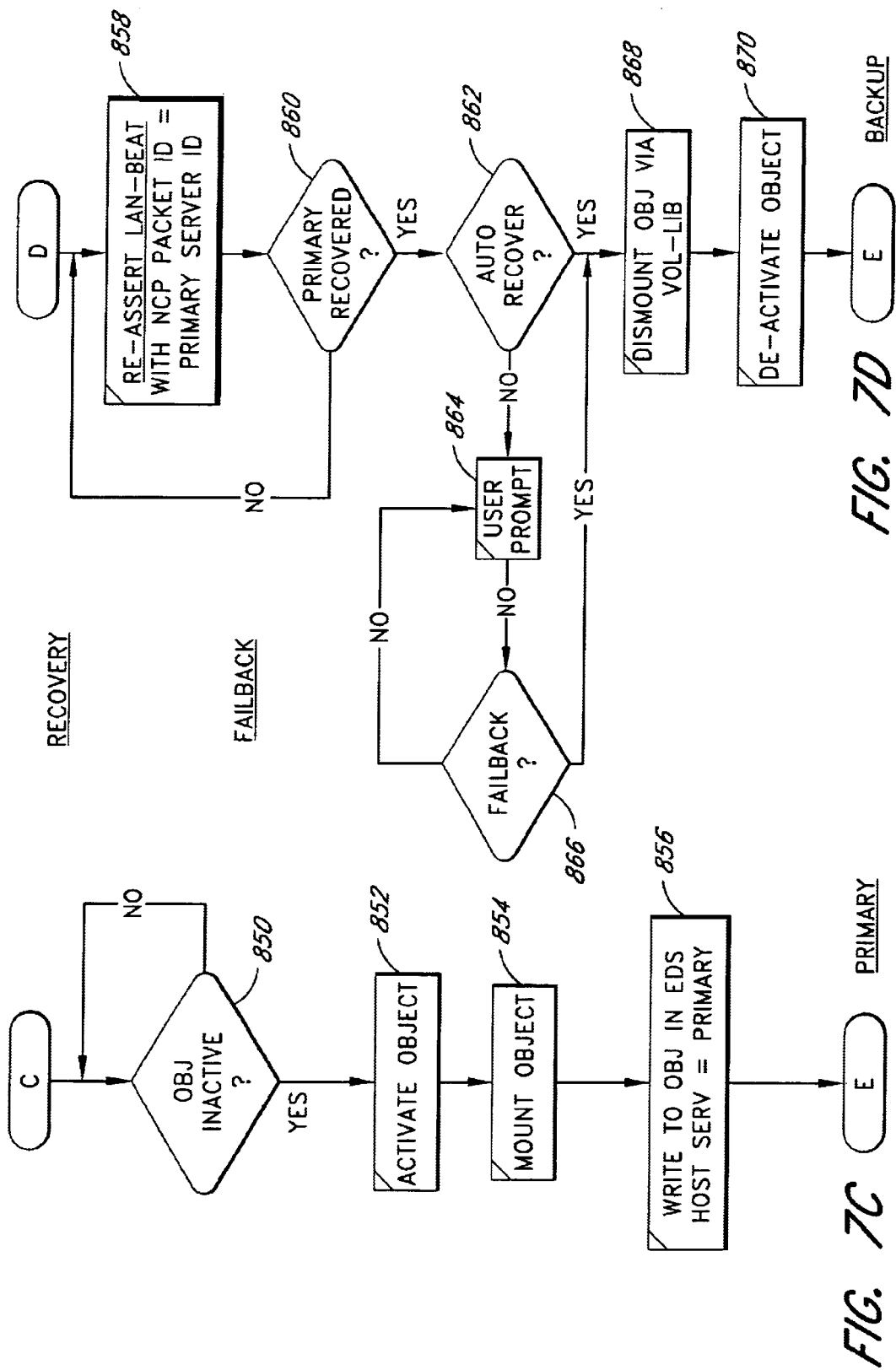

SYSTEM FOR CLUSTERING SOFTWARE APPLICATIONS

RELATED APPLICATIONS

This application is related to U.S. patent application Ser. No. 08/942,318, entitled, "Method for Clustering Software Applications," which is commonly owned.

PRIORITY CLAIM

This Application is a divisional of and claims priority to and incorporates by reference, U.S. application Ser. No. 08/942,411, filed Oct. 1, 1997, now U.S. Pat. No. 6,363,497 which in turn claims priority under 35 U.S.C. §119(e) to U.S. Application No. 60/046,327, titled, "Clustering of Computer Systems Using Uniform Object Naming and Distributed Softare for Locating Objects, filed May 13, 1997.

APPENDICES

Appendix A, which forms a part of this disclosure, is a list of commonly owned copending U.S. patents and patent applications. Each one of the patents and applications listed in Appendix A is hereby incorporated herein in its entirety by reference thereto.

Appendix B, which forms part of this disclosure, is a copy of the U.S. provisional patent application filed May 13, 1997, entitled "Clustering of Computer Systems Using Uniform Object Naming and Distributed Sotware For Locating Objects" and assigned Application No. 60/046,327. Page 1, line 7 of the provisional application has been changed from the original to positively recite that the entire provisional application, including the attached documents, forms part of this disclosure.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to fault tolerant computer systems. More particularly, the invention relates to providing fault tolerant execution of application programs in a server network, by providing a method and system for executing an application program in a backup server if it is determined that a primary server, which normally executes the program, has failed.

2. Description of the Related Technology

As computer systems and networks become more complex and capital intensive, system failures which result in lost data and/or inaccessible applications have become unacceptable. In the computer industry, the reduction of computer failures and computer "downtime" is a major focus for companies trying to achieve a competitive edge over their competitors. The reduction of downtime due to system failures and maintenance is critical to providing quality performance and product reliability to the users and buyers of computer systems. Particularly with respect to server computers which are accessed and utilized by many end users, the reduction of server downtime is an extremely desirable performance characteristic. This is especially true for users who depend on the server to obtain data and information in their daily business operations.

As servers become more powerful, they are also becoming more sophisticated and complex. A server is typically a central computer in a computer network which manages common data and application programs that may be accessed by other computers, otherwise known as "workstations," in the network. Server downtime, resulting from hardware or software faults or from repair and maintenance, continues to be a significant problem today. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging internet, intranet and collaborative applications taking on more essential business roles every day, the cost of network server downtime will continue to spiral upward.

Various systems for promoting fault tolerance have been devised. To prevent network down time due to power failure, uninterruptible power supplies (UPS) are commonly used. Basically a rechargeable battery, a UPS provides insurance that a workstation or server will survive during even extended periods of power failures.

To prevent network downtime due to failure of a storage device, data mirroring was developed. Data mirroring provides for the storage of data on separate physical devices operating in parallel with respect to a file server. Duplicate data is stored on separate drives. Thus, when a single drive fails the data on the mirrored drive may still be accessed.

To prevent network downtime due to a failure of a print/file server, server mirroring has been developed. Server mirroring as it is currently implemented requires a primary server and storage device, a backup server and storage device, and a unified operating system linking the two. An example of a mirrored server product is the Software Fault Tolerance level 3 (SFT III) product by Novell Inc., 1555 North Technology Way, Orem, Utah, as an add-on to its NetWare □ 4.x product. SFT III maintains servers in an identical state of data update. It separates hardware-related operating system (OS) functions on the mirrored servers so that a fault on one hardware platform does not affect the other. The server OS is designed to work in tandem with two servers. One server is designated as a primary server, and the other is a secondary server. The primary server is the main point of update; the secondary server is in a constant state of readiness to take over. Both servers receive all updates through a special link called a mirrored server link (MSL), which is dedicated to this purpose. The servers also communicate over the local area network (LAN) that they share in common, so that one knows if the other has failed even if the MSL has failed. When a failure occurs, the second server automatically takes over without interrupting communications in any user-detectable way. Each server monitors the other server's NetWare Core Protocol (NCP) acknowledgments over the LAN to see that all the requests are serviced and that OSs are constantly maintained in a mirrored state.

When the primary server fails, the secondary server detects the failure and immediately takes over as the primary server. The failure is detected in one or both of two ways: the MSL link generates an error condition when no activity is noticed, or the servers communicate over the LAN, each one monitoring the other's NCP acknowledgment. The primary server is simply the first server of the pair that is brought up. It then becomes the server used at all times and it processes all requests. When the primary server fails, the secondary server is immediately substituted as the primary server with identical configurations. The switch-over is handled entirely at the server end, and work continues without any perceivable interruption.

Power supply backup, data mirroring, and server mirroring all increase security against down time caused by a failed hardware component, but they all do so at considerable cost. Each of these schemes requires the additional expense and complexity of standby hardware, that is not used unless there is a failure in the network. Mirroring, while providing redundancy to allow recovery from failure, does not allow the redundant hardware to be used to improve cost/performance of the network.

What is needed is a fault tolerant system for computer networks that can provide all the functionality of UPS, disk mirroring, or server mirroring without the added cost and complexity of standby/additional hardware. What is needed is a fault tolerant system for computer networks which smoothly interfaces with existing network systems. Additionally, what is needed is a method or system of clustering application software programs which may be executed by servers within the network such that a software application being executed on a first server may be "backed-up", e.g., clustered, by a second server which continues execution of the application if for some reason the first server fails.

SUMMARY OF THE INVENTION

The invention addresses the above and other needs by providing a method and system for clustering software application programs which are executable by one or more servers in a server network.

In one embodiment, a system for fault tolerant execution of an application program in a server network, includes: a first server for executing the application program; a cluster network database, coupled to the first server; an object, stored in the cluster network database, which represents the program and contains information pertaining to the program; a failure detection module which detects a failure of the first server; a second server, coupled to the cluster network database; and a failover module which loads the application program in the second server upon detection of the failure of the first server, in accordance with the information contained in the object.

In another embodiment, a system for fault tolerant execution of an application program in a server network, includes: a first server for executing the application program; a cluster network database for storing objects therein; a cluster interface for prompting a system operator for information to be store in the objects, wherein the information comprises: a host server attribute which identifies which server is currently executing the program; a primary server attribute which identifies which server is primarily responsible for executing the program; and a backup server attribute which identifies which server is a backup server for executing the program if the primary server experiences a failure. The system further includes a second server, coupled to the database, for executing the program if the first server fails; a failure module which detects if the first server has failed; a failover module which executes the program in the second server if it is determined that the first server has failed, the failover module comprising: a backup status module which reads the backup server attribute in the object and determines whether the backup server attribute names the second server as the backup server; a backup loading module which loads the program in the second server if the backup server attribute names the second server as the backup server; a phoenix module which determines if the first server is once again operational; and a failback module which resumes execution of the program in the first server if it is determined that the first server is once again operational, the failback module comprising: a backup unload module which unloads the program from a random access memory in the second server; a verification module which verifies that the program has been unloaded from the second server; and a primary load module which loads the program in a random access memory in the first server after the program has been unloaded from the second server.

In a further embodiment, a system of loading and registering a software program in a cluster network database, coupled to a first server and a second server in a server network, includes: a primary load module which loads the program in the first server; a preregistration module which determines if the program was previously registered; an object module which creates an object for the program and stores the object in the database, if it is determined that the program was not previously registered; a nonfailure module which determines if a system operator previously unloaded the program and sets a host server attribute within the object to a value of null, if it is determined that a system operator previously unloaded the program; a phoenix detect module which determines if the first server is coming back from a failback process, if it is determined that the system operator did not previously unload the program; and a synchronization module which synchronizes all replicated databases within the network, if it is determined that the first server is not coming back from failback process.

In another embodiment, a system for fault tolerant execution of an application program in a server network, includes: a first server for executing the application program; a cluster network database, coupled to the first server; an object, stored in the cluster network database, which represents the program and contains information pertaining to the program; a failure detection module which detects a failure of the first server; a second server, coupled to the cluster network database; a reading module which reads the information from the object; and a failover module which loads the application program in the second server upon detection of the failure of the first server, in accordance with the information contained in the object.

In a further embodiment, a system for fault tolerant execution of an application program in a server network having a first and second server, includes: means for executing the application program in the first server; means for storing an object which represents the program in a cluster network database, wherein the object contains information pertaining to the program; means for detecting a failure of the first server; and means for executing the application program in the second server upon detection of the failure of the first server, in accordance with the information in the object.

In yet another embodiment, a system for fault tolerant execution of an application program in a server network having a first and second server, includes: means for executing the application program in the first server; means for storing an object which represents the program in a cluster network database, wherein the object contains information pertaining to the program; means for detecting a failure of the first server; means for reading the information contained in the object; and means for executing the application program in the second server upon detection of the failure of the first server, in accordance with the information in the object.

In another embodiment, a system for providing fault tolerant execution of an application program in a server network having a first and second server, includes: means for executing said application program in said first server; means for detecting a fault in the execution of said application program in said first server; and means for automatically, without operator intervention, executing said application program in said second server in response to said detecting step.

In a further embodiment, a system for providing fault tolerant execution of an application program in a server network having a first and second server, includes: means for executing said application program in said first server; means for detecting a fault in the first server; and means for automatically, without operator intervention, executing said application program in said second server in response to said detecting step.

In another embodiment, a system for providing fault tolerant execution of an application program in a server network having a first and second server, includes: means for executing said application program in said first server; means for detecting a failure of said first server to properly run said application; and means for automatically, without operator intervention, executing said application program in said second server in response to said detecting step.

In a further embodiment, a network server system, includes: a first server and a second server, each configured to execute a first application program; a first control module for causing said first server to execute said first application program when said first server is capable of executing said first application program; and a second control module for causing said second server to execute said first application program when said first server is incapable of executing said first application program.

BRIEF DESCRIPTION OF THE DRAWINGS

FIGS. 4A–4H illustrate functional diagrams which show various states of objects stored in two replicated network directory databases, wherein the objects represent a clustered application during a detect, failover and failback process, in accordance with one embodiment of the invention.

FIGS. 7A, 7B, 7C and 7D collectively illustrates a flowchart for one embodiment of a process of failure detection and failover, in accordance with the invention.

DETAILED DESCRIPTION OF THE INVENTION

The invention is described in detail below with reference to the figures, wherein like elements are referenced with like numerals throughout. It is understood that the embodiments described below are merely illustrative of the invention and should not be construed to limit the scope of the invention as indicated by the appended claims.

In one embodiment, the invention involves an enhanced network directory database which operates in conjunction with server resident processes, i.e., Netframe Cluster software, to remap the execution of clustered applications, or clustered programs, in the event of a server failure. In one embodiment, the enhanced network directory database is replicated throughout all servers of the network. As explained in further detail below, the database stores configuration data ("objects") which contain for each clustered application, a primary and a secondary server affiliation as well as other information. Initially, all users access a clustered application through the server identified in the object as being the primary server for that clustered application When server resident processes, otherwise known as Netframe Cluster software, detect a failure of the primary server, the enhanced database is updated to reflect the failure of the primary server, and to change the affiliation of the clustered application from its primary to its secondary, or backup, server. In one embodiment, the updating and remapping are accomplished by server resident processes which detect a failure of the primary server, and remap the clustered application server affiliation. This remapping occurs transparently to whichever user is accessing the clustered application. Thus, all users access a clustered application through the backup server. This process may be reversed when the primary server resumes operation, the backup server unloads the clustered application from memory, and then users may again access the clustered application through the primary server, thereby regaining fault tolerance, i.e. backup, capability.

No dedicated redundant resources are required to implement the current invention. Rather, the current invention allows server resident processes to intelligently relocate cluster applications to servers in the event of server failure. A server may be a primary server with respect to a clustered application loaded in its memory, a secondary or backup server with respect to another clustered application stored in its hard drive, though not loaded in memory, and function as a fully functional file server.

Figure 1:
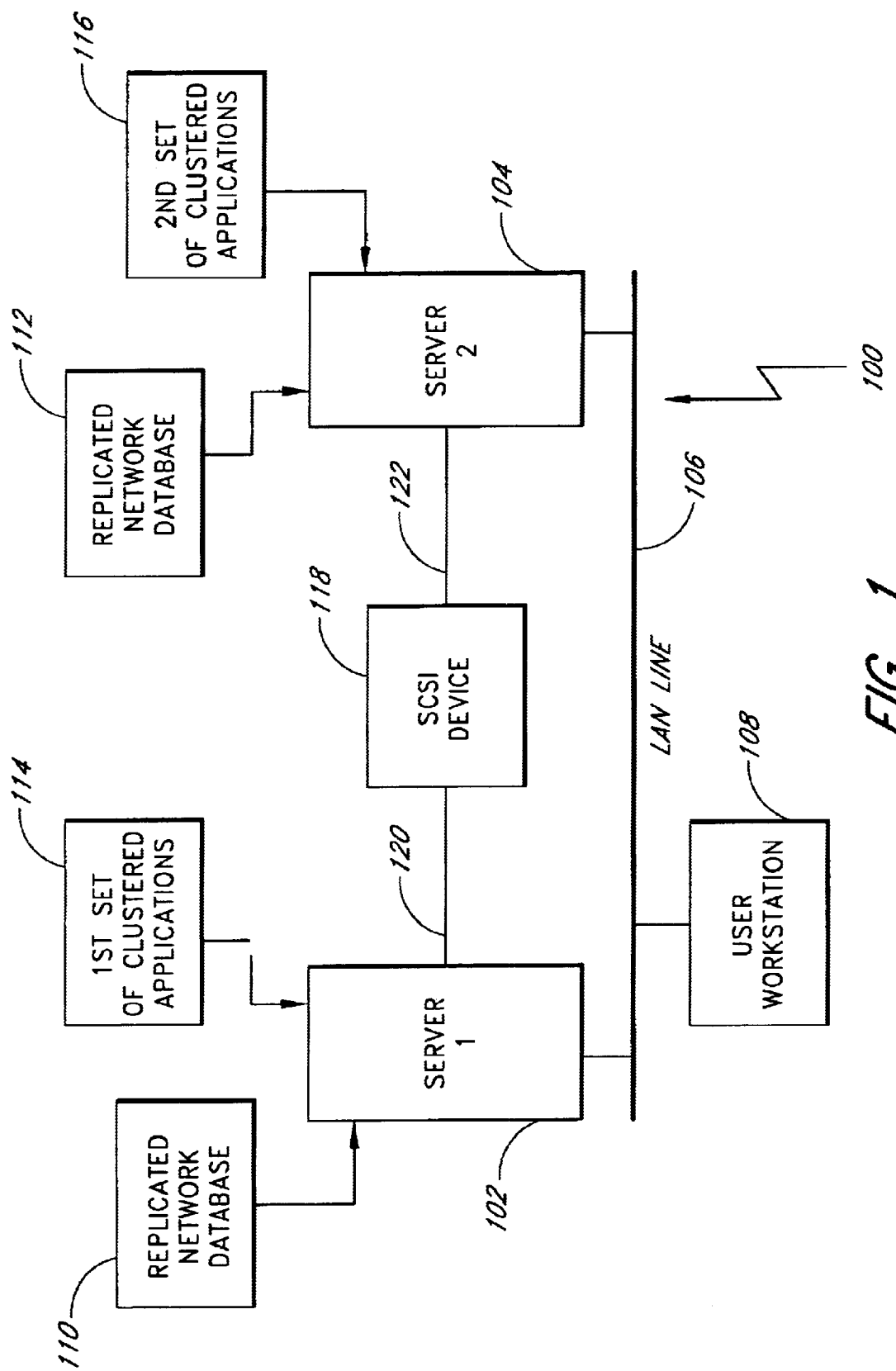
FIG. 1 is a block diagram of one embodiment of a clustered application server network in accordance with the invention.

Referring to FIG. 1, one embodiment of a clustered application server network 100, in accordance with the invention is illustrated. The network 100 includes a first fileserver computer 102 (server 102) and a second fileserver computer 104 (server 104), both connected to a local area network (LAN) line 106. A user or client may access either of the servers 102 or 104 by means of a user workstation 108 also connected to the LAN line 106. The network 100 also includes a first replicated network database 110, coupled to or contained within the first server 102, and a second replicated database 112, coupled to or contained within the second server 104. Each replicated database 110 and 112 contain the exact same information as the other (hence "replicated") so as to serve as a common "information control center" for the various processes involved in clustering data and application programs, as described in further detail below. In one embodiment, the network may include a single network data base 110, for example, which is coupled with the servers 102 and 104. Also, in one embodiment, each replicated network directory database 110 and 112 may be a part of a NetWare Directory Services (NDS) architecture, which is provided in Novell's NetWare 4.x product. However, the replicated network directory database is not limited to Netware database architectures and other network operating systems may be utilized by the invention. The format and functioning of the databases 110 and 112 is described in greater detail below with reference to FIG. 2.

The information contained within each database 110 and 112 includes objects which each represent a corresponding application program stored within the first server 102 and the second server 104, as well as other information. As explained in further detail below with reference to FIG. 2, each object contains records, or attributes, relating to its corresponding program. As shown in FIG. 1, a first set of application programs 114 is stored within a hard drive (not shown) of the first server 102. A second set of application programs 116 is stored within a hard drive (not shown), typically the C:\ drive, of the second server 104. These applications are executable in their respective servers 102 and 104 by loading them into the random access memory (RAM) space of its respective server 102 and 104. As also explained in further detail below, each program is assigned a primary server, which is normally responsible for its execution, and a backup server, which is responsible for its execution if the primary server goes down (i.e., fails).

The network 100 further includes a small computer system interface (SCSI) device 118 which is coupled to the first server 102 via a first SCSI bus 120, and coupled to the second server 104 via a second SCSI bus 122. As explained in further detail below, in one embodiment, the SCSI device 118, the first SCSI bus 120 and the second SCSI bus 122, are utilized by the server network 100 in order to provide a method and system for detecting the operational status of one server by the other.

Figure 2:
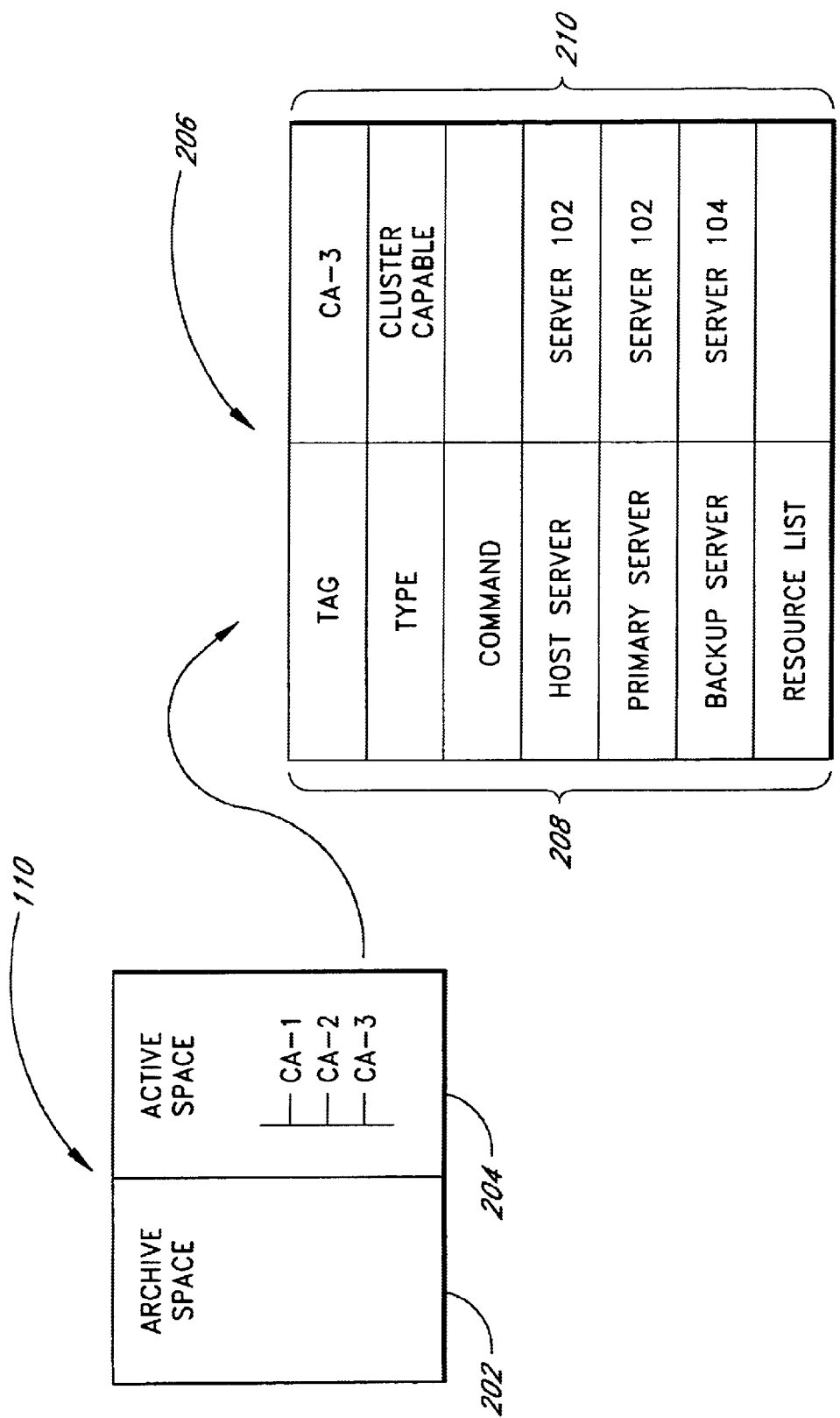
FIG. 2 is a functional block diagram of one embodiment of a replicated database and object which is stored in the database which may be used in the network of FIG. 1 in accordance with the invention.

FIG. 2 provides a functional block diagram of the first replicated network directory database 110 of FIG. 1 and an object 206 which is stored in the database 110. It is understood that the second replicated database 112 is identical to the first database 110. An update to one database will result in the replication of the update in the other database. The databases 110 and 112 are updated, for example, when a clustered application is loaded or unloaded in a server or when server affiliations are changed. The database 110 also contains an active memory space which contains objects of all application programs currently being executed by the first server 102. As shown in FIG. 2, these objects include CA-1, CA-2 and CA-3. A functional diagram of the object 206 for cluster application CA-3 is also illustrated. The object 206 located in the active space 204 represents a clustered application CA-3, loaded in the random access memory (RAM) of the first server 102. An application loaded in RAM, for purposes of describing the invention herein, is assumed to be executing unless otherwise specified.

The object 206 has specific object attributes 208 and attribute values 210. As defined by the network cluster software, in one embodiment, a clustered application object has the following attributes: TAG, TYPE, COMMAND, HOST SERVER, PRIMARY SERVER, BACKUP SERVER, and RESOURCE LIST. TAG is an identifier such as CA-3. Each clustered application has a different tag to distinguish itself. TYPE refers to whether the clustered application is cluster capable or cluster aware. COMMAND refers to the command line parameters which control loading and executing of a clustered application. The HOST SERVER is where the clustered application is currently loaded in memory. The PRIMARY SERVER is where the clustered application is normally loaded. The BACKUP SERVER is where the clustered application is loaded after the primary server fails. The RESOURCE LIST is a list of hardware and software resources required by the cluster application.

Cluster Capable and Cluster Aware Applications

Applications can be categorized three ways: cluster capable, cluster aware, and unclusterable. There are two types of applications that network clustering software such as Netframe Cluster software may accommodate. They are cluster capable and cluster aware applications. Cluster capable applications are applications that may be clustered, but typically may not take advantage of the special network cluster software functionality and features. Cluster aware applications are applications that not only may be clustered, but may also take full advantage of the special network cluster software and architecture. As such, cluster aware applications in a network cluster software environment, e.g. Netframe Cluster, are more programmable and efficient in implementing its tasks.

In order to take advantage of network cluster software, the application usually must be clusterable, that is, it is usually at least cluster capable. Cluster capable applications typically satisfy three criteria: location independence, cache memory independence, and recoverability.

An application is location independent if a replacement instance of the application can be run on more than one server. An application is usually not location independent if the physical address of the server cannot be reassigned or packets cannot be rerouted. Therefore, an application that hard codes itself to a specific IP address is typically not location independent. If an application is location independent, then once a file server fails, all other servers and all clients may communicate with the backup server to run that application. If the application cannot be loaded and run on a backup server then it is usually not location independent, and thus usually not cluster capable.

The application should also typically be independent or substantially independent from the file server cache memory. Currently, it is difficult to recover lost data from the cache memory after a failure. Any files not written to the disk, or any state information of the application in memory, is usually lost. Therefore, a cluster application should be tolerant to this data loss when the application recovers. If the loss of information in memory is an acceptable cost when weighing the advantages of clustering, then this prong of the test may be satisfied.

The application should preferably be recoverable. Most databases and well written electronic mail systems are recoverable. Recoverable applications may back out of an incomplete task and self-terminate. This allows the application to be loaded in another server within the network without creating conflicts in which two copies of the application are running on two separate servers.

If all three criteria of location independence, cache memory independence, and recoverability are met then the application is cluster capable and may be clustered. Cluster capable applications are typically commercially available programs which meet the above criteria but which were not written specifically with clustering in mind. However, some applications are specifically written with network cluster software in mind. These applications are cluster aware applications.

In order for an application to be cluster aware, it is usually written to take advantage of the network cluster software and architecture. A cluster aware application takes advantage of supporting utilities that are available through an application programming interface (API) of the cluster software. These utilities may be sets of functions called by the cluster aware application that insure a smooth transition between the primary server and the backup during failover and failback, for example, intercommunication between the network cluster software and the cluster application may be utilized to minimize transition delays and provide additional functionality as described in further detail below.

FIGS. 3A–D illustrate functional block diagrams showing the various states of a first server 102 and a second server 104 during a sequence of detection, failover and failback events. Although a clustered application can be loaded on any of the servers of a network system, the present disclosure assumes that a clustered application is affiliated with server 102 as its primary server. Workstations 302 and 304 are running client software of the clustered application through the primary server 102 as indicated by communication path 312. Therefore, server 102 is the host and primary server of the application. Server 104 is assigned as the backup or secondary server. The object values of these attributes are updated in the database 110 and 112 if any of these assignments are changed. Both servers 102 and 104 have a copy of the cluster application stored in their hard drives. Both servers 102 and 104 have Netframe Cluster software loaded to execute resident server processes 306 and 308, respectively. Servers 102 and 104 each contain identical databases, 110 and 112, respectively. Server 102 runs process 306 for detection, failover and failback. Server 104 runs process 308 for detection, failover and failback.

Figure 3A:
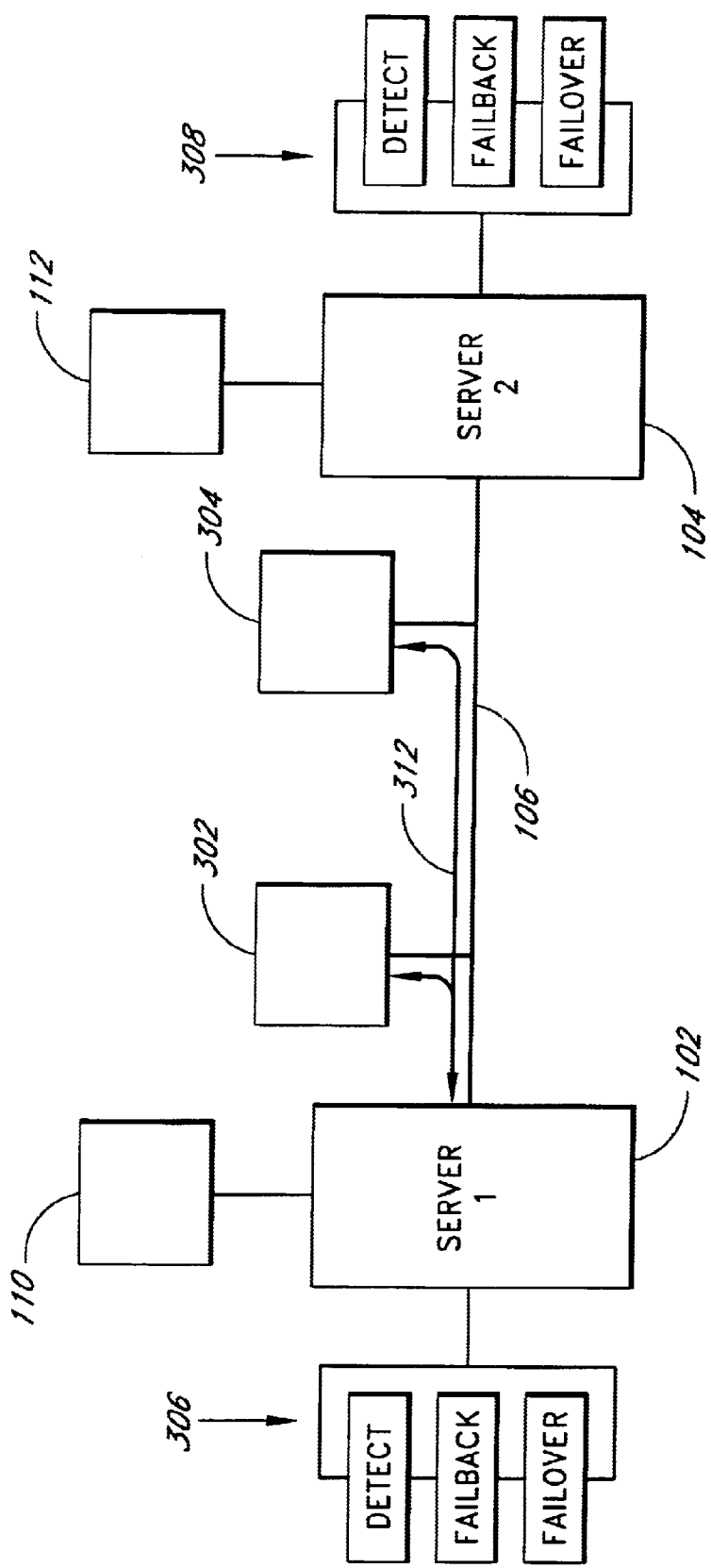
FIGS. 3A–3D illustrate hardware block diagrams showing various states of the network hardware during a detect, failover and failback operation in accordance with one embodiment of the invention.
Figure 3B:
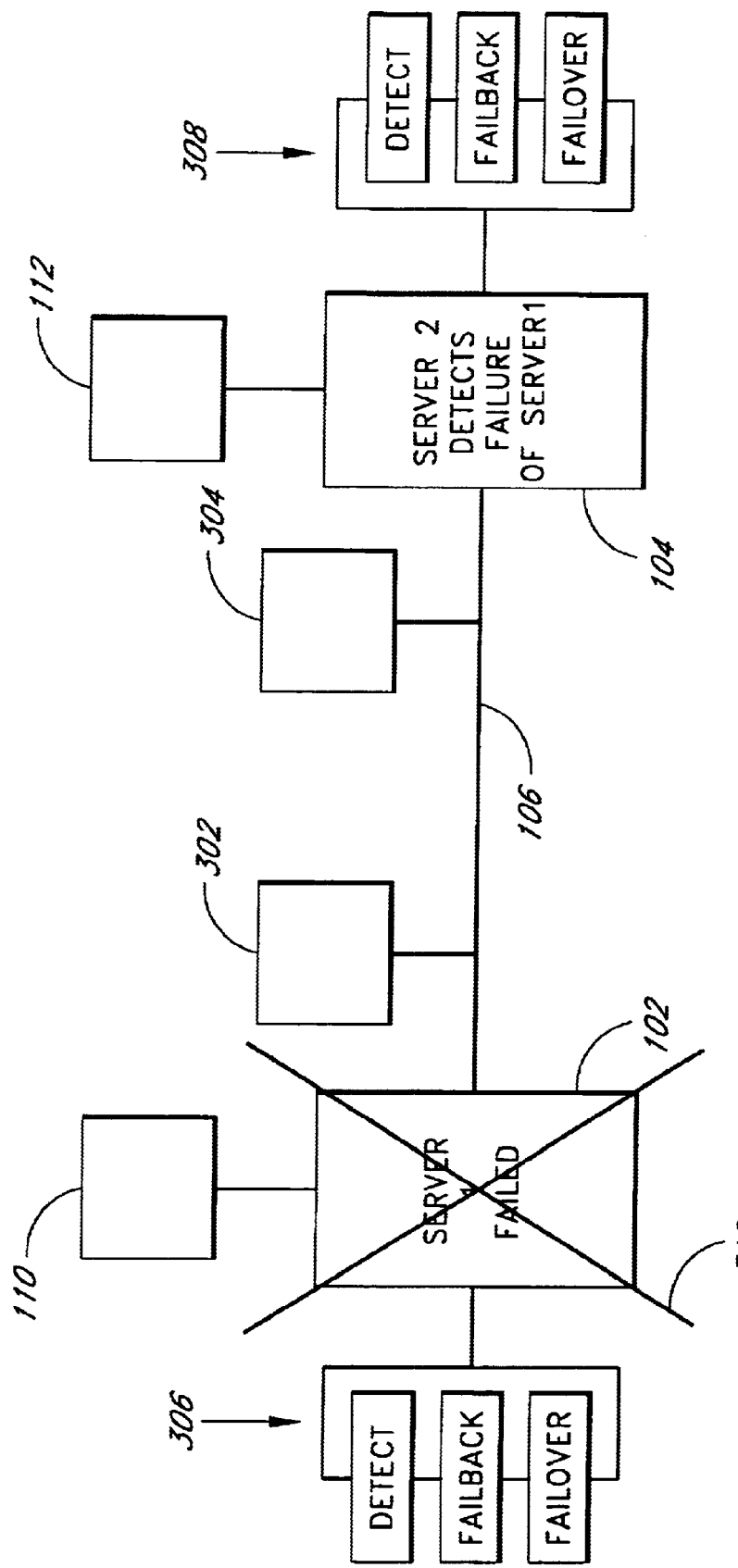

FIG. 3B shows an instance in which the primary server 102 has failed, as indicated by the termination mark 310. Communications between server 102 and workstations 302 and 304 are terminated.

Figure 3C:
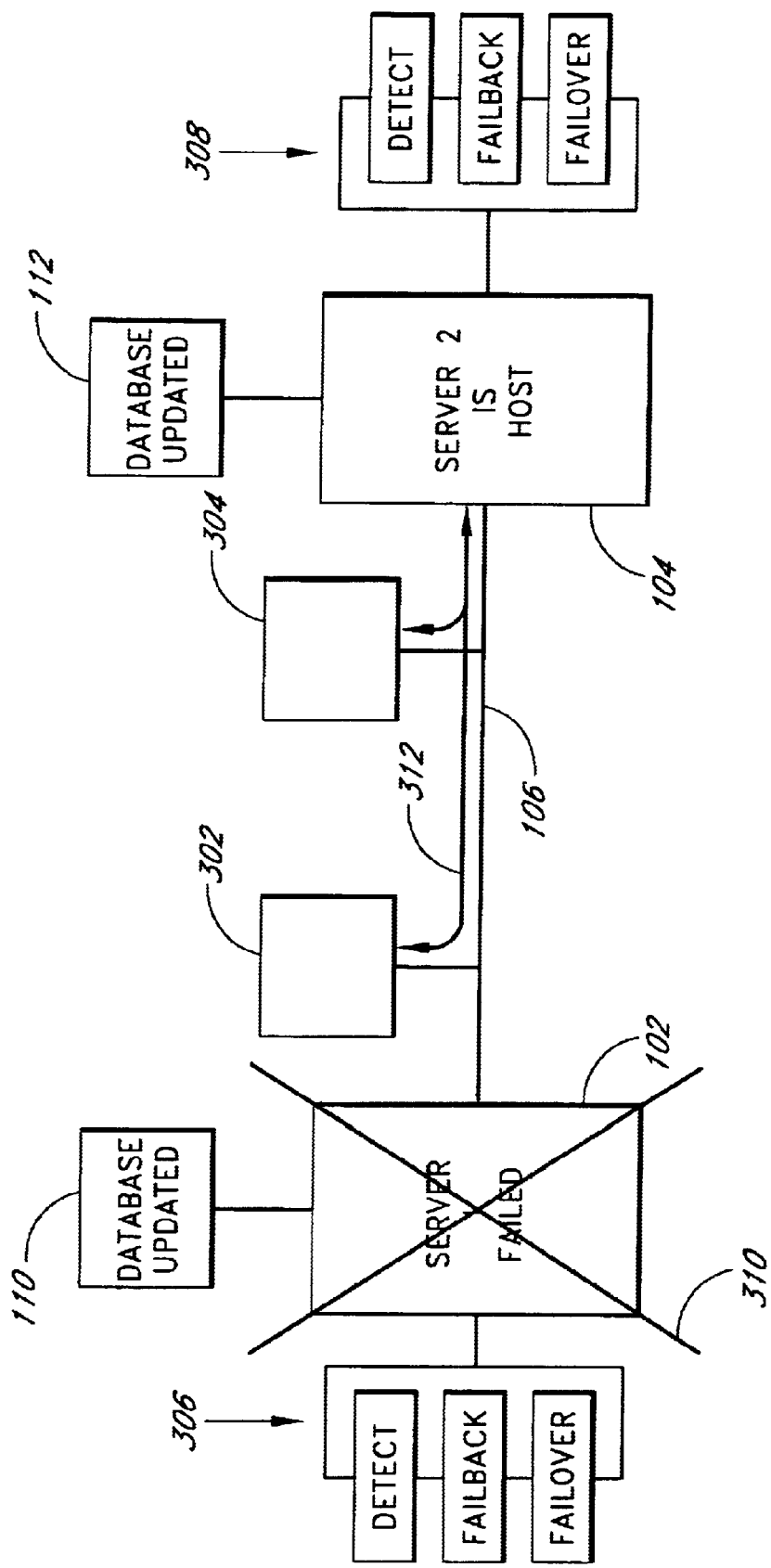

In FIG. 3C, the process 308 running on the second server 104 has detected the failure of the first server 102. As described above, the clustered application that is loaded into the RAM of the first server 102 is represented in the databases 110 and 112 by an object. Since the object contained in databases 110 and 112 designates the second server 104 as the backup server, the second server 104 will load its own copy of the clustered application from its hard drive and execute the clustered application upon detection of the primary server failure. Upon detection of the failure of a server, the Netframe Cluster software updates the database 112. The object in the databases is updated such that the value of the host server attribute is changed to the second server 104, the backup server. Because the attribute values in the object for the cluster application have been changed, communications with the clustered application will now be rerouted through server 104. This process is referred to as the failover process herein.

Figure 3D:
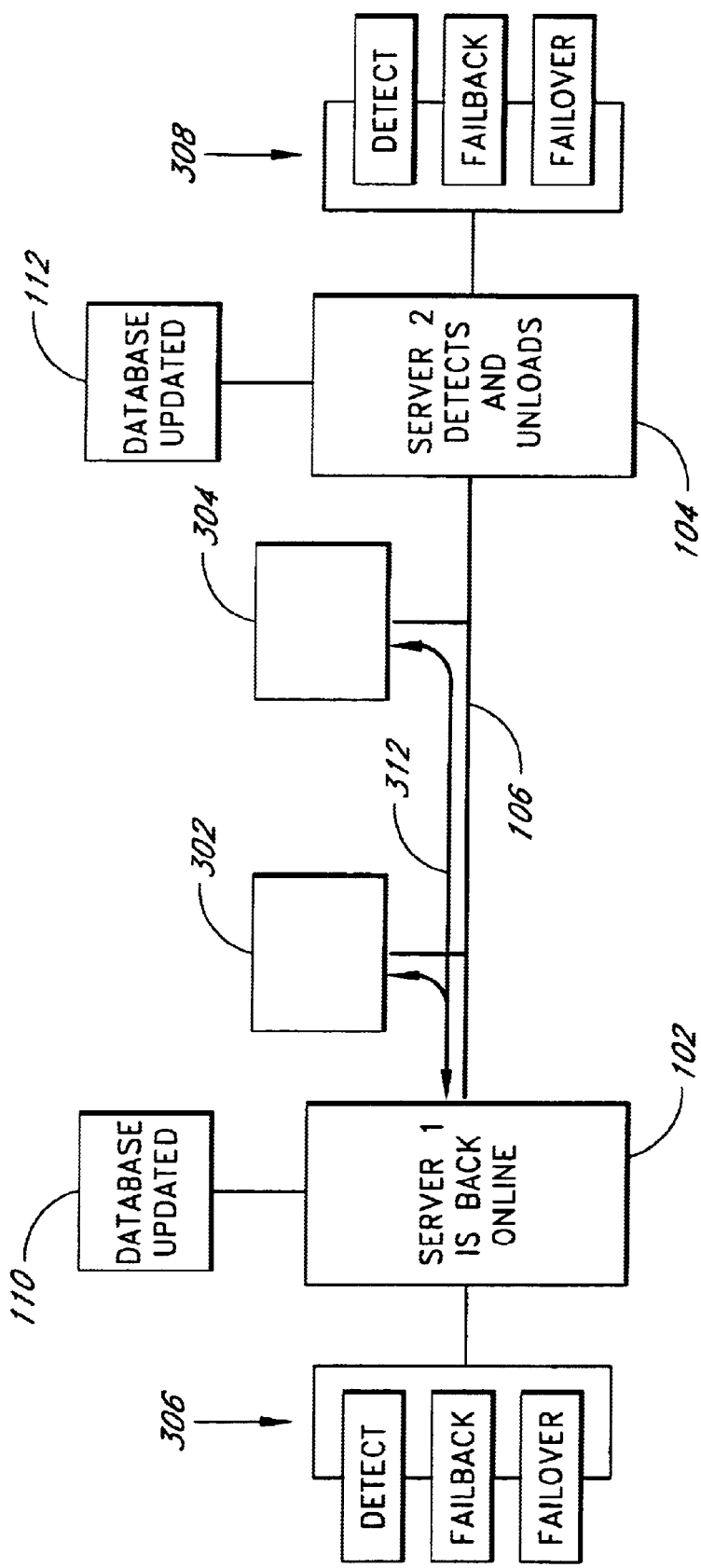

FIG. 3D indicates that the first server 102 has resumed normal operation. From here, the next act depends upon whether the clustered application is cluster capable or cluster aware.

If the application is cluster capable, then in FIG. 3D the server process 308 of the second server 104 detects that server 102 has resumed normal operation. The second server 104 then initiates unload of the application. When server 102 initially comes back "on-line," it attempts to load the cluster capable application, but cannot as a result of a software blocking mechanism in the Netframe cluster software. Because of conflicts, the cluster capable application cannot be loaded and executed from multiple servers in a network at the same time. Therefore, the first server 102 cannot load the cluster capable application until after the backup server 104 has unloaded it. In order to unload the application at the backup server 104, a user, through a software interface, must unload the cluster capable application from server 104 RAM, by executing a command line for unloading the cluster capable application. The Netframe cluster software may then update the databases 110 and 112 to make server 104 the backup server and server 102 the host and primary server. At this point, failback procedure is complete.

If the application is cluster aware, then the application which was written to take advantage of network cluster software will be able to handle the transition from secondary to primary server more smoothly and efficiently through function calls to Netframe Cluster software via an application programming interface (API). When the first server 102 resumes normal operations, the cluster aware application is loaded into the first server 102. However, it is in a pause mode as a result of a built-in feature of cluster aware applications. Prior to allowing itself to execute, the cluster aware application checks for conflicts. The cluster aware application checks the database 110 with respect to the object which represents the cluster aware application and notes that server 102 is the primary server for the cluster aware application, but is not the host server. It further notes that the second server 104 is assigned as the host server. Therefore, the cluster aware application is aware that it is a primary server coming out of failure. The clustered application that has been loaded into the primary server memory will not be executed until it verifies that the backup server has unloaded the clustered application. The cluster aware application has thus effectively been paused.

After the first server 102, which is designated as the primary server of the cluster aware program, is repaired, or otherwise brought back "on-line," the second server 104, which is the designated backup server of the cluster aware application, detects that the first server 102 is once again operational. This detection mechanism is explained in further detail below with respect to FIG. 5. Upon detecting that the primary server 102 is once again operational, the cluster application running on the secondary server 104 initiates an automatic unloading protocol to unload itself from the secondary (backup) server 104. Once the cluster aware application in the backup server 104 has been unloaded from RAM, then the Netframe Cluster software updates the databases 110 and 112 such that the primary server 102 is once again the host. Subsequently, the cluster aware application in the primary server 102 detects that the primary server 102 is once again the host and therefore the backup server 104 has unloaded. The cluster aware application terminates its paused function and executes. The failback process is complete.

A comparison of the two descriptions of failback processes for cluster capable and cluster aware demonstrates that cluster aware applications benefit from intimate intercommunication with the network cluster software. When the Netframe Cluster software is able to interact with the application program to control the cluster processes, as is the case with cluster aware applications, the failback, as well as the failover, process occurs smoothly and efficiently with less delay when compared to similar processes for cluster capable applications. For cluster capable applications, there is usually no automatic unloading function. Therefore, the Netframe Cluster software must usually prompt a system operator or user to manually unload the application from the backup server. Meanwhile, the primary server 102 must usually wait until the unloading is complete. Additionally for cluster capable applications, the functionality of deleting and correcting the primary server from loading the application until the backup has unloaded, must typically be programmed in the network cluster software. This is a less efficient and less elegant way of implementing this function and furthermore, requires additional overhead in terms of processing time and system resource use.

Figure 4A:
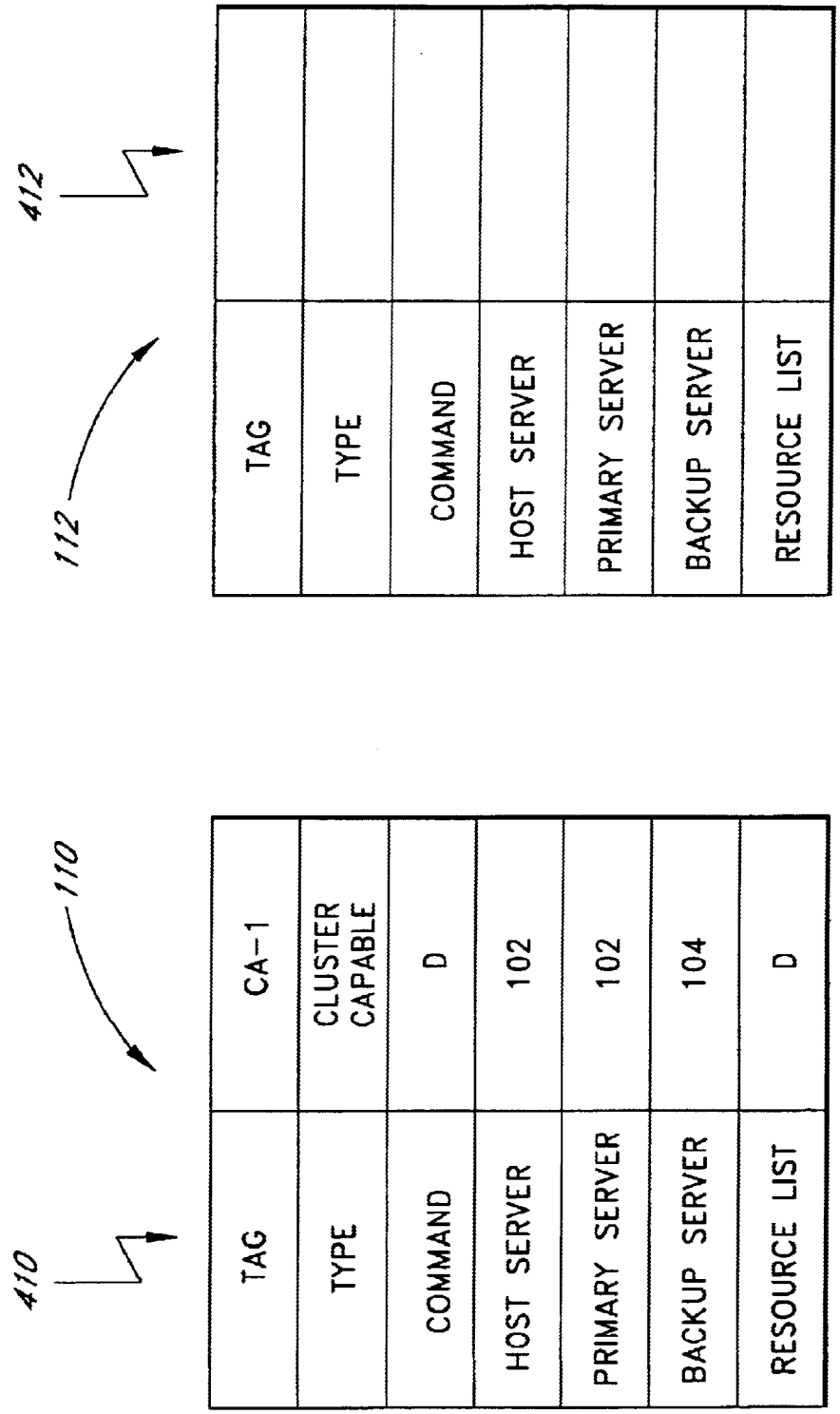
Figure 4B:
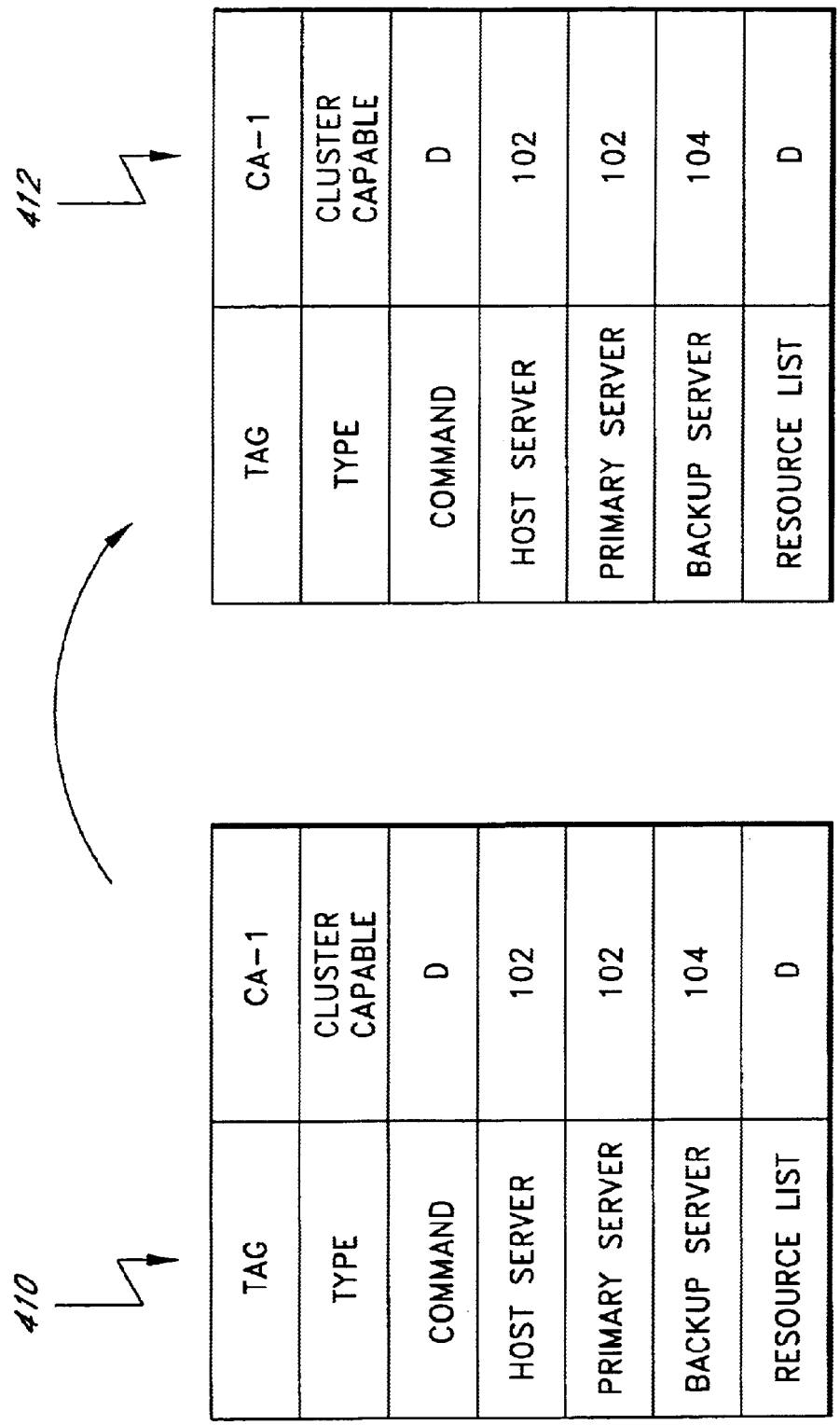
Figure 4C:
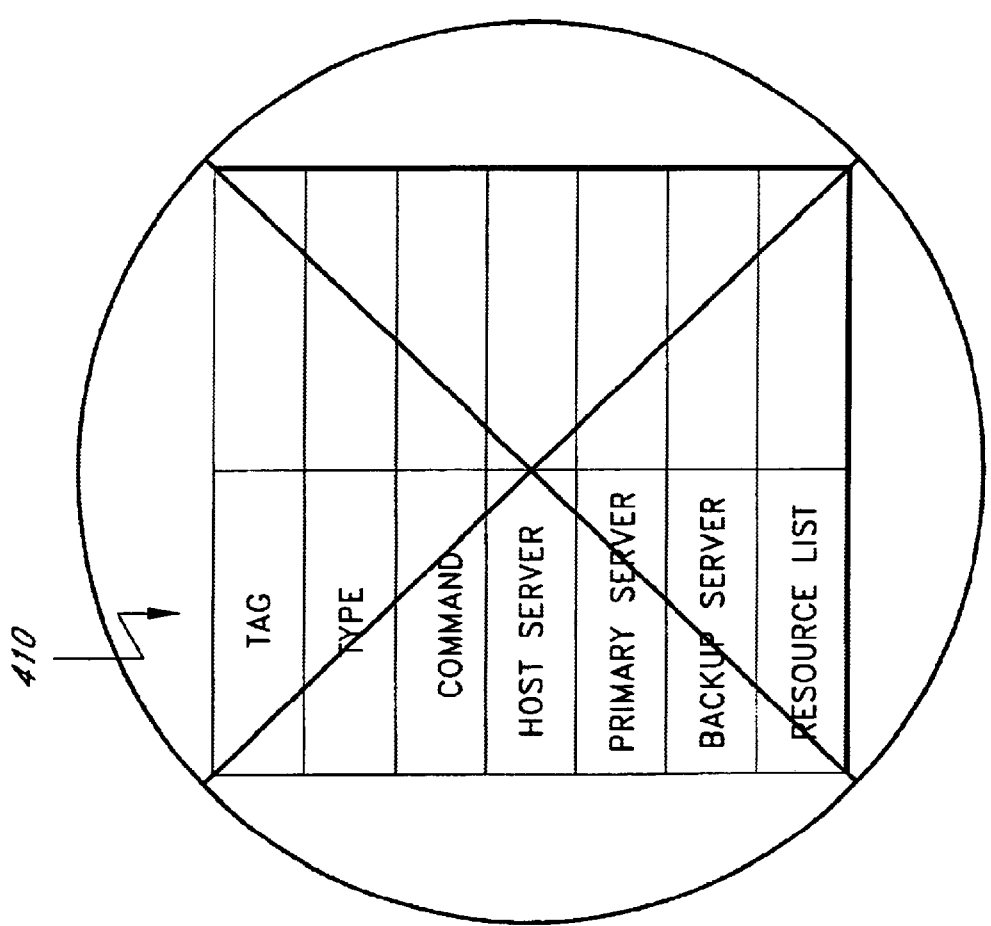
Figure 4D:
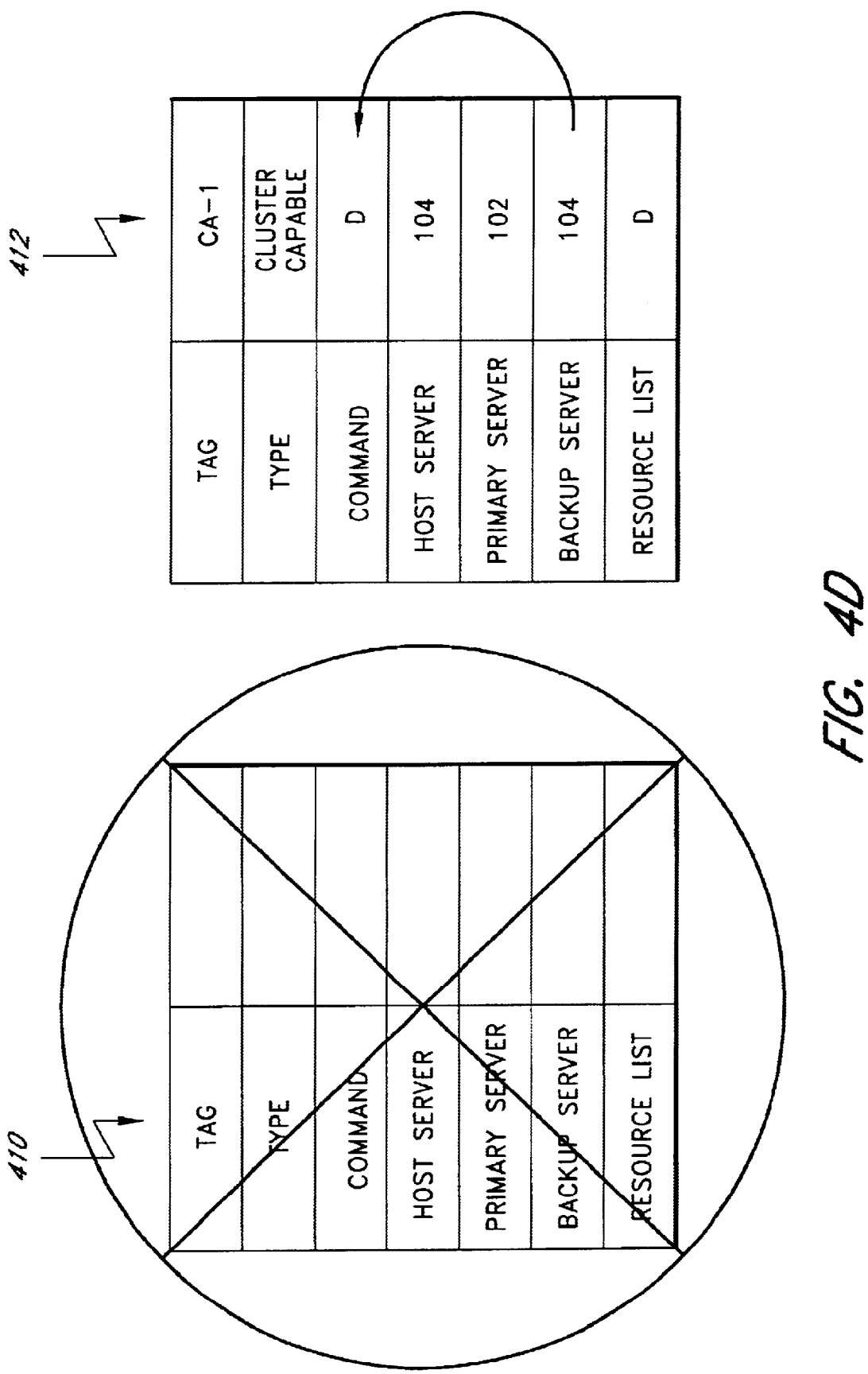
Figure 4H:
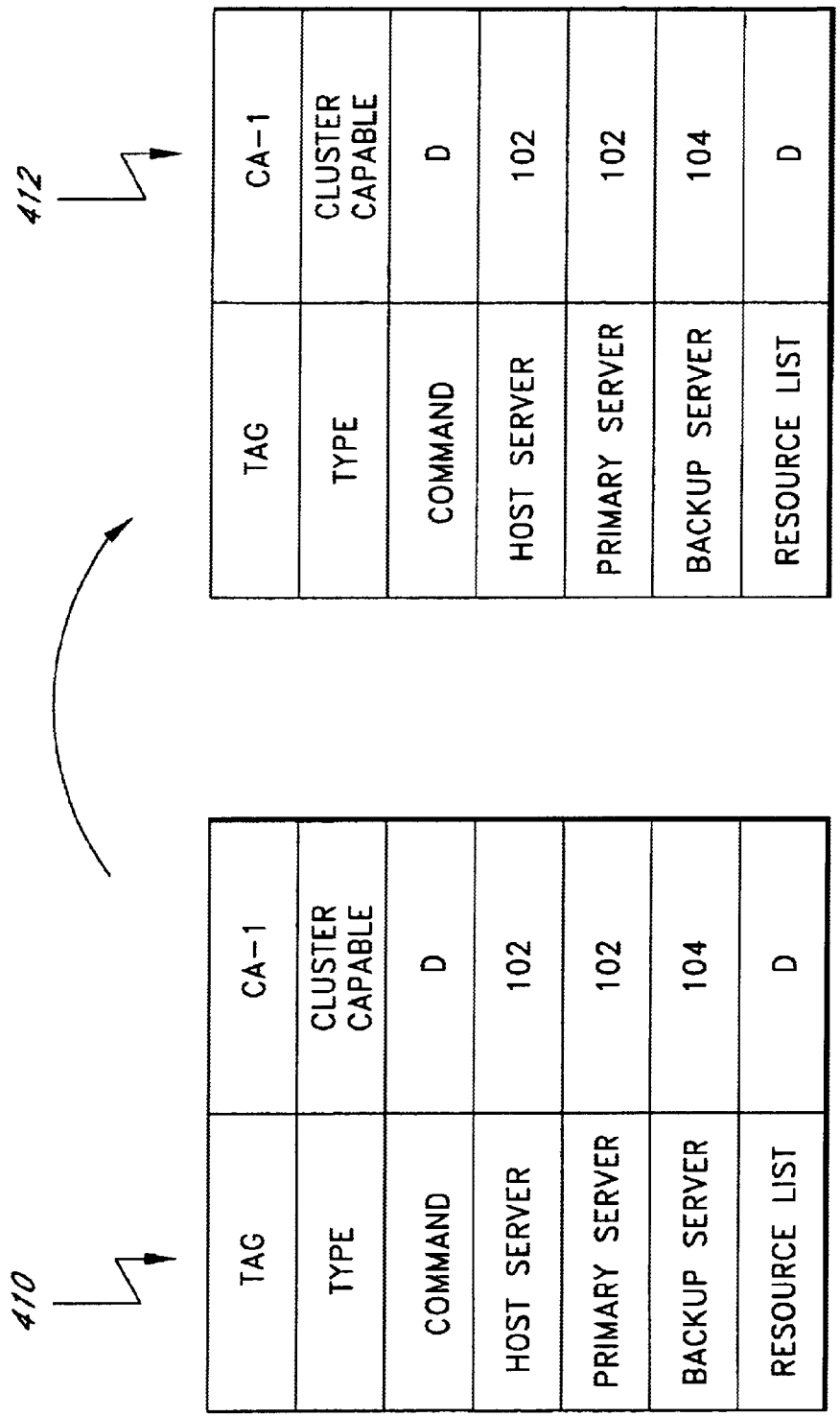

FIGS. 4A–H show objects 410 and 412 stored in the databases 110 and 112 of each server 102 and 104 for the sequence of detection, failover and failback for the execution of a cluster capable application. The objects 410 and 412 represent the cluster capable application as described above. A □D□ means that there is an attribute value for a given attribute, but that it is not important to show its value for this discussion. FIG. 4A shows the objects 410 and 412 once the cluster capable application is loaded on the primary server 102, but before server resident processes 308 (FIGS. 3A–D) can update the database 112. FIG. 4B shows that the second database 112 has been updated to include an object representing the cluster capable application. FIG. 4C shows the objects 410 and 412 immediately after the primary server 102 has failed. Object 410 is crossed out to reflect that it is no longer available as a result of the primary server 102 failing. FIG. 4D shows the objects 410 and 412 after the backup server 104 loads the cluster capable application. Note that now server 104 is the host server. Immediately after the primary resumes normal operations, the primary server 102 recovers its object attribute values from immediately prior to server failure as shown in FIG. 4E. These attribute values are now out of date. Since object 412 is more up to date than object 410, the object 412 gets copied onto the object 410 as shown in FIG. 4F. Once the second server 104 detects that the primary server 102 has resumed normal operation, the server resident processes 310 at server 104 unload the cluster capable application and, thereafter, the primary loads it and update the attribute values as in FIG. 4G. Finally, as shown in FIG. 4H, the updated object 412 is copied to the less current object 410.

Figure 5:
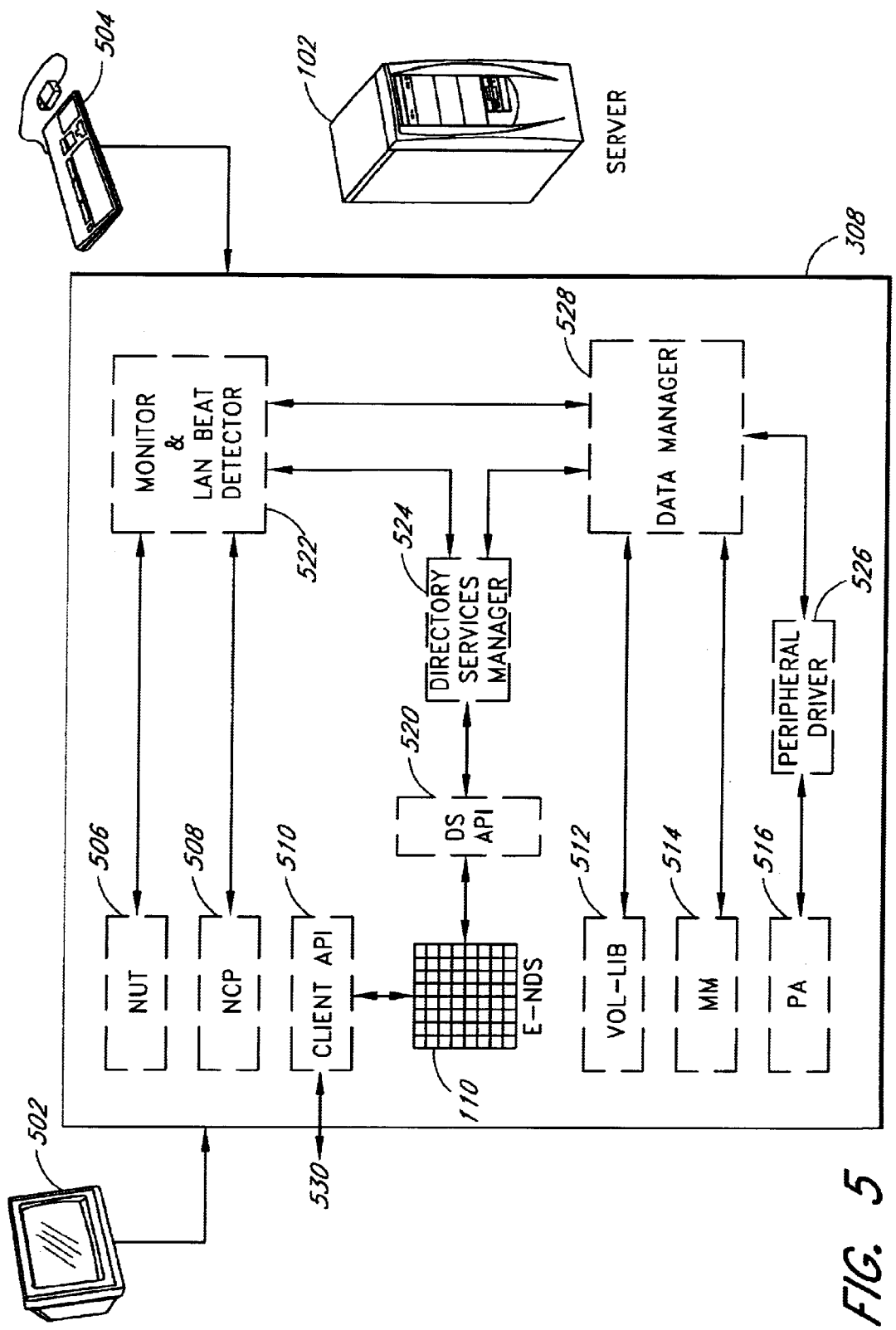
FIG. 5 is a functional block diagram showing some of the processing modules of a Netframe Cluster software program in accordance with one embodiment of the invention.

FIG. 5 is a block diagram of an embodiment of some basic modules of the Netframe Cluster software resident on the server 102 which collectively accomplish the server resident processes 308 associated with detection, failover and failback as well as other cluster functions. Similar modules exist on each server. A server input unit 504 and display 502 are shown. Modules 506–516 are currently provided with network utilities such as NetWare□ 4.x. These modules may interact with modules 520–528 in order to provide the resident processes 308 for detection, failover and failback. Module 506 may be a NetWare Loadable Module (NLM) which provides a graphical user interface in order to interact with NetWare□ 4.x and with the resident processes 308. Module 508 may be a communication module which provides connection oriented service between servers. A connection oriented service is one that utilizes an acknowledgment packet for each package sent. Module 510 may include client base applications which allow a workstation to communicate through interface port 530 directly with network software and the resident processes 308. Module 110 is the database 110 of FIG. 1 and is a replica of the enhanced network directory database which may include objects as described above. Module 512 is loadable and provides volume management services including scanning for, mounting and dismounting volumes. Module 514 is a media manager module which allows a server to obtain identification numbers for directly attached resources. Module 516 is a peripheral attachment module which allows the server to communicate with directly attached devices such as storage devices or printers. Module 520 provides an application programming interface (API) which allows additional attributes to be added to each object in the enhanced network directory database. This module also allows the attribute values for those additional attributes to be viewed, altered, or updated.

Modules 522–528 may interact with the above discussed modules to provide the server resident processes for detection, failover and failback. Module 522 may handle communications with a user through network user terminal module 506. Module 522 may also be responsible for sending and receiving packets through NCP module 508 to manage failure detection and recovery detection of a primary server. Module 524, the directory services manager, may be responsible for communicating through module 520 with the enhanced network directory database 110. Module 524 controls the adding of attributes, and the viewing and editing of attribute values within that database. Module 526 is a device driver which in a current embodiment superimposes a phase shifted signal on the peripheral communications between a server and its direct connected resources to detect server failure. Module 526 sends and receives these phase shifted signals through module 516. Module 528 controls the overall interaction of modules 522–526. In addition, module 528 interfaces with module 512 to scan, mount and dismount objects or resources. Furthermore, module 528 interacts with module 514 to obtain device hardware identifiers for directly attached devices.

Additionally, through the API 520 the Netframe Cluster software can interact and communicate with additional functionality provided by cluster aware applications. Such functionality is provided by a resource module within the cluster aware application which contains a list of resources required to executed the application. Moreover, the resource module may create the RESOURCE LIST attribute in a corresponding object and store resource identifiers in the attribute value field by automatically writing to the object in the database. When a backup server detects a primary server failure, the Netframe Cluster software can be called to read the backup server's BIOS or configuration files in order to determine which resources are available on the backup server. By comparing a resource list stored in the object attribute RESOURCE with information contained in the backup system BIOS and/or start up configuration files, the cluster aware application can determine if the required resources are available.

In another embodiment, the cluster aware application may include an automatic registration module wherein, upon being loaded, the cluster aware application automatically determines if it has been previously registered and, if not, then creates an object, stores the object in the database and writes attribute values to the object. One embodiment of this process is described in further detail below with respect to FIG. 6. As used herein, the term "module" refers to any software, firmware or hardware, or any combination thereof which may be implemented to perform a specified function, process, procedure or protocol.

A further functionality that may be provided by cluster aware applications is that of "leaving a marker" to resume execution of the application where a previous server "left off" or ceased operations. A marker set module may be written into a cluster aware application which constantly updates a pointer as each line of code is executed, for example. The location of this pointer may be periodically written to an application specific interface (ASI) file located within the network directory database. When a backup server detects the failure of a primary server, the backup will launch the cluster aware application. Before executing, a marker-read module in the application reads the ASI file and obtains the pointer value. The application then proceeds to execute at a location in the program indicated by the pointer.

Figure 6:
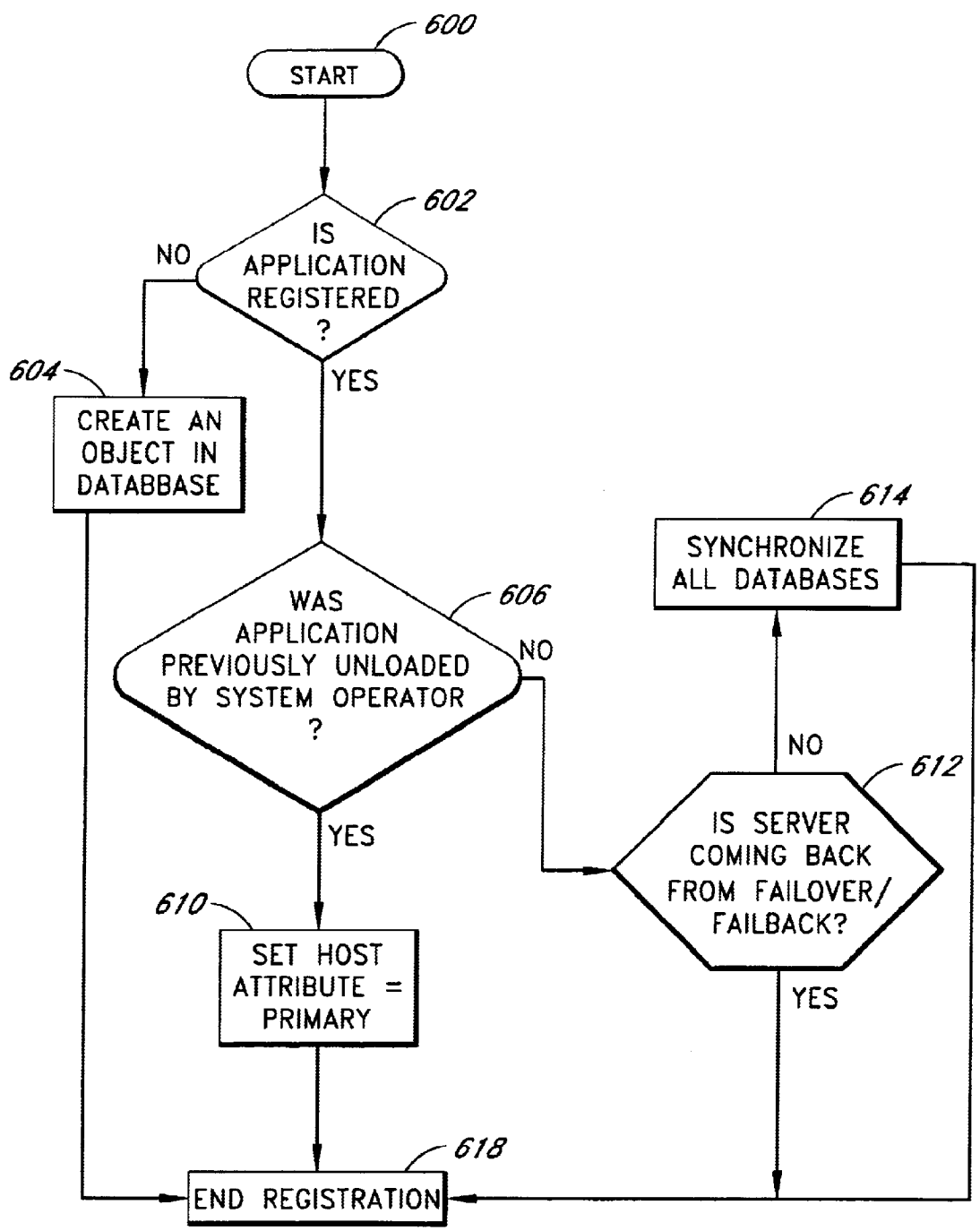
FIG. 6 is a flowchart diagram of a process of determining the registration status of a cluster application program and thereafter taking appropriate steps depending on the registration status, in accordance with the one embodiment of the invention.

Referring to FIG. 6, a flowchart diagram of one embodiment of a process of determining the registration status of an application loaded on a primary server is illustrated. The process begins at step 600, at which point the application program has been loaded into the RAM of a primary server, and proceeds to step 602. In step 602, the process queries whether the application has been previously registered. The process does this by scanning the database 110 (FIG. 2), which stores all objects registered in the database 110. During this scan it looks for an object with a TAG identifier which corresponds to the application program that has been loaded into the primary server, and a PRIMARY attribute value which matches the ID of the server on which the application program is loaded. If the application has been previously registered, an object with the above TAG and PRIMARY attribute values should exist. If it is determined in step 602 that the application is not registered, then in step 604 an object is created for the application and stored in the database. For cluster capable applications, objects are typically created manually by prompting a system operator to insert the various attribute values. However, for cluster aware programs, a registration module may be embedded in the program which automatically creates the object and writes attribute values to the object. This registration module is typically the first operation executed by the cluster aware application.

If in step 602, it is determined that the application is already registered, then in step 606, the process queries whether the application was previously unloaded by a system operator. When a registered application is loaded, there are three possible scenarios which have lead to this condition. The first is that a system operator had previously loaded and registered the application and voluntarily unloads the application (i.e., exits from the program). In this case, when the system operator manually unloads the application, Netframe Cluster software sets the HOST SERVER attribute within the object for the application to a value of null (0). The second scenario is that after the application was loaded and registered, the primary server failed and execution of the application resumed in a backup server. Upon coming back on line, otherwise known as "phoenixing," the primary server will once again load the program. The third is when both primary and backup have failed and are now recovering. These three scenarios should be distinguished because they require different types of updates to the object in the database. This distinction of the scenarios is carried out by step 606 by checking the HOST attribute value in the object.

If the application was previously manually unloaded by a system operator, the HOST attribute value will be null. If in step 606 it is determined that the preregistered application was previously manually unloaded by a system operator, the process moves to step 610 wherein the process resets the HOST attribute to equal the primary server ID value. The registration/status check process then ends at step 618 and execution of the application may proceed. If in step 606, it is determined that the application was not previously unloaded by a system operator, the process moves to step 612 in which the process queries whether the primary server is phoenixing. If the primary server is phoenixing, i.e., the primary is rebooting, the HOST attribute value will be set to a backup server ID value. In this state, for cluster aware applications, the application is loaded but in a pause mode, as described above. If the primary service is phoenixing, the process knows that the application is running on a backup server and, therefore, the primary must have previously failed and is now regaining control over the application from a backup. The execution of the application is commenced upon the backup server unloading its version of the application program, and the Netframe Cluster software updating the HOST attribute to indicate the primary once again.

However, if the HOST attribute is set to the primary server ID value, it is determined that there has been a simultaneous failure of the backup and primary servers (a rare occurrence). If in step 612, it is determined that the primary is undergoing the failover/failback process executed by Netframe Cluster software, then the registration/status check process ends at step 618. The failover/failback processes continue on their own accord and carry out the processes of updating the database and switching control over the application between a primary server and a secondary server, as described above. However, if in step 612, it is determined that the primary server is not in a failover/failback mode, the registration process determines that some type of major network failure has occurred, e.g., a power failure to all servers, and proceeds to step 614 in which it synchronizes all the replicated databases in the server network. The process then ends at step 618.

FIGS. 7A and 7B shows the failure detection and failback portions of both the primary and backup processes. The processes for a server performing as a primary with respect to an object commence with splice block A. From splice block A control passes to process 800. In process 800 a drive pulse is asserted. The drive pulse is appropriate for those objects which are connected to the server by a bus, a Small Computer Storage Interconnect (SCSI) bus with multiple initiators, or any other means of connection. The drive pulse is asserted by the primary server across this connection. The pulse enables the secondary server to sense primary server failure, as will be discussed shortly in connection with processes 802–808. The primary server with respect to a storage device connected to both servers 102 and 104. When the resident processes on server 102 process an object in the enhanced network directory database corresponding to storage device, the primary server, server 102, transmits a drive pulse to the storage device. Control passes from process 800 directly to primary splice block C. In another embodiment, the detection mechanism may be implemented by transmitting SCSI RELEASE and RESERVE commands to an SCSI device from the primary server. The backup server may monitor the release and reserve status of the SCSI device in order to ascertain the operational status of the primary server. Referring again to FIG. 1, this "SCSI heartbeat" method is implemented by transmitting SCSI RESERVE and RELEASE commands to the SCSI device 118 via the SCSI bus 120. The secondary server 104 monitors the operational status of the first server 102 by transmitting SCSI Test Unit Ready signals to the SCSI device 118 and determining the reserve/release status of the SCSI device 117. A more detailed discussion of this "SCSI heartbeat" method of monitoring the operational status of the primary server is discussed in greater detail in a co-pending U.S. patent application entitled, "A Method and System For Communicating A Software-Generated Pulse Waveform Between Two Servers in a Network," which is listed in Appendix A attached hereto.

The processes run on the backup server in connection with failure-detection and fail-over are initiated at splice block B, which is shown on the right-hand side of FIG. 7A. Control passes from splice block B to processes 802–804. In process 802 the backup server continually monitors the LAN communication between itself and the primary server to determine when the primary server has failed. It does this by determining the primary server ID from the host server attribute value. This object attribute ID is appended by the LAN detector module 522 to network control protocol packets. These packets are sent intermittently by the network control protocol module 508 [see FIG. 5] on the backup server to the primary server to determine when the primary server fails. Concurrently, in process 804, the drive pulse is monitored. Control is then passed to decision process 806.

In decision process 806, a determination is made as to whether on the basis of LAN communications, the primary server has failed. In the event this determination is in the negative, control returns to processes 802 and 804. Alternately, if this determination is in the affirmative i.e., that the primary server is no longer responding to the secondary server's NCP packets, then control is passed to decision process 808. In decision process 806, a determination is made as to whether the drive pulse from the primary is still being received by the secondary server. If a determination is made that the communication between the primary server and the storage device has not failed, i.e., that the drive monitor is still detecting drive pulses from the primary, then control returns to processes 802 and 804. This secondary drive detection assures that a momentary LAN failure will not result in the determination that the primary server has failed when in fact that primary server still is communicating with the resource/object such as storage device. In the alternative, if determination is reached in decision process 808 that the primary server is no longer communicating with the resource/object, then control is passed to the process 810. In process 810 the user is notified of the failure of a primary server. The notification occurs through the cooperative operation of modules 528, 522 and 508 discussed above in connection with FIG. 5. Control is then passed to process 812. In process 812 the secondary server activates the object and passes control to process 814. In process 814 the secondary server mounts the object i.e., physically assumes control over the object. Control is then passed to process 816 in which the secondary server writes into the host server attribute the value for its ID in place of the primary server ID. This new attribute value is then replicated across all enhanced network directory databases on all the servers in the enterprise. Thus, a failure has been detected and transparently to the user an alternate path for communications between workstations and an object, e.g. a cluster capable application is established through the secondary server, e.g. server 102.

FIGS. 7B and 7D detail the recovery and fail-back processes on the servers which have a primary and backup relationship with respect to a specific object being processed. The server which has a backup relationship initiates the recovery fail-back process at splice block D. Control then passes to process 858 in which the backup server initiates a LAN heartbeat to enable it to determine whether the primary server has resumed normal operation. This LAN beat was discussed above in connection with process 802 [see FIG. 7A]. Control is then passed to decision process 860. In decision process 860 a determination is made on the basis of the LAN beat as to whether or not the primary server has recovered. If this determination is in the negative, then control returns to process 858. Alternately, if the determination in made in the affirmative i.e., that the primary has recovered, then control passes to decision process 862.

In decision process 862, a determination is made as to whether the auto-recover attribute value 218A is enabled, i.e., boolean TRUE. In the event this determination is in the negative, then control is passed to process 864. In process 864, the user or network administrator is prompted with the news of a recovery and a request for direction as to whether to initiate failback. Control is then passed to decision process 866. In decision process 866 a determination is made as to whether the user response was in the affirmative. In the event that determination is in the negative, control returns to process 864. Alternately, if that determination is in the affirmative, i.e., the user has indicated that fail-back is appropriate, then control passes to process 868. Alternately, if in decision process 862 a determination is made in the affirmative, i.e., that auto-recovery has been enabled, then control also passes to process 868. In process 868, the backup server dismounts the object. An object dismount is accomplished by the backup server through the cooperative interaction of data manager module 528 and Vol-Lib module 512. [See FIG. 5] Control then passes to process 870. In process 870, the backup server deactivates the object. Control is then passed to splice block E in which the processing of the next object is initiated.

The processes for recovery and fail back as performed on a server designated as primary with respect to a specific object being processed commences at splice block C. Control then passes to decision block 850. In decision block 850, a determination is made as to whether the object has been inactivated. An object which has been deactivated on the backup server in process 870, will be detected by the primary server in decision process 850 to be inactive. In the event the determination in decision process 850 is in the negative, then control loops back to re-initiate that same decision process 850. Alternately, if a determination in the affirmative is reached, i.e., that the object has been de-activated, then control passes to process 852. In process 852, the object is activated by the primary server. Control then passes to process 854. In process 854, the object is mounted by the primary server. Control then passes to process 856. In process 856, the primary server modifies the host server attribute value with respect to that object and writes its own ID into the host server attribute value. Control is then passed to blocks A and B in which the processing of the next object is initiated.

Figure 8:
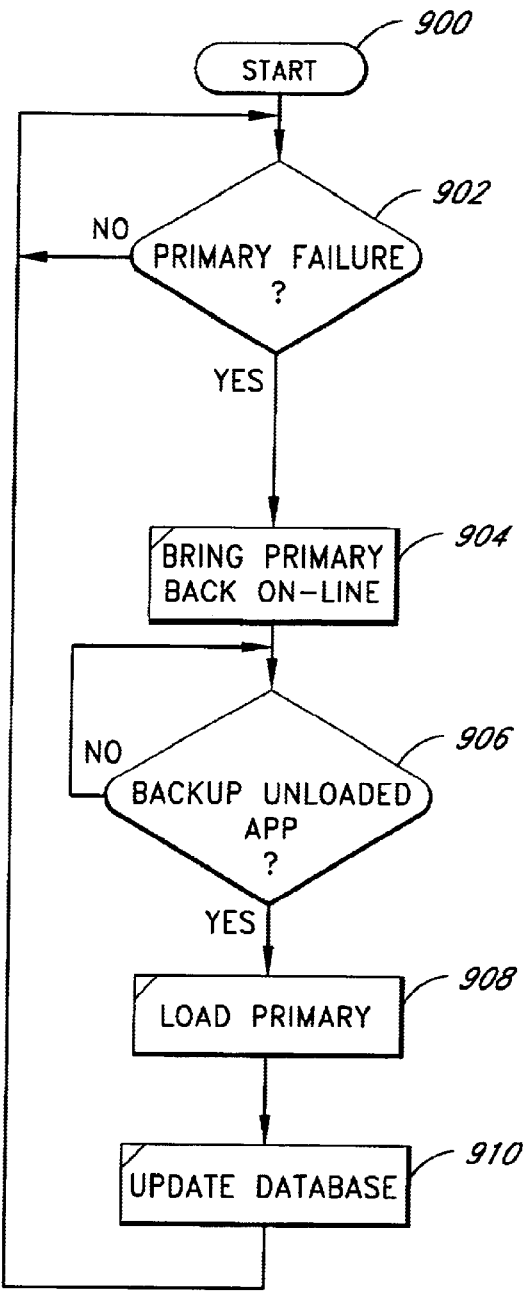
FIG. 8 illustrates a flowchart of one embodiment of a detection failover/failback process as seen by a primary server, in accordance with the invention.

Referring to FIG. 8 a flowchart diagram of one embodiment of a failover/failback process as seen by a primary server is illustrated. It is understood that the failover process includes actions by both the primary and backup servers and, similarly, the failback process includes actions by both the primary and backup servers. The following description discusses processes carried out at or by the primary server during an overall process of failure detection, failover and failback. The process starts at location 900. In step 902, a determination is made as to whether the primary server has failed. This is a separate enquiry from the one made by the backup server, as described above. In step 902, the determination is made from the perspective of a system operator or network administrator, who must be notified that the primary server is down in order to take remedial actions to fix the primary server. One embodiment of a method and system of such a failure reporting system is described in a co-pending and commonly owned U.S. patent application, entitled, "Method of Automatically Reporting A System Failure in a Server Network," which is listed in Appendix A attached hereto.

If in step 902 it is determined that the primary has not failed, the step recursively repeats itself. If it is determined that the primary server has failed, in step 904, a system operator who has been notified of the failure, as described above, repairs the failure and brings the primary server back on-line. Upon being operational again, a failback module queries whether the backup has unloaded its version of the application. This query is made by interrogating the object in the database and verifying that the HOST attribute has been set to the primary server ID once again. Upon verifying that the backup server has unloaded the application, in step 908 the process loads the application into the RAM of the primary and begins executing. In step 910, a replicated databus within the primary server is updated to reflect the change in HOST affiliations.

Figure 9:
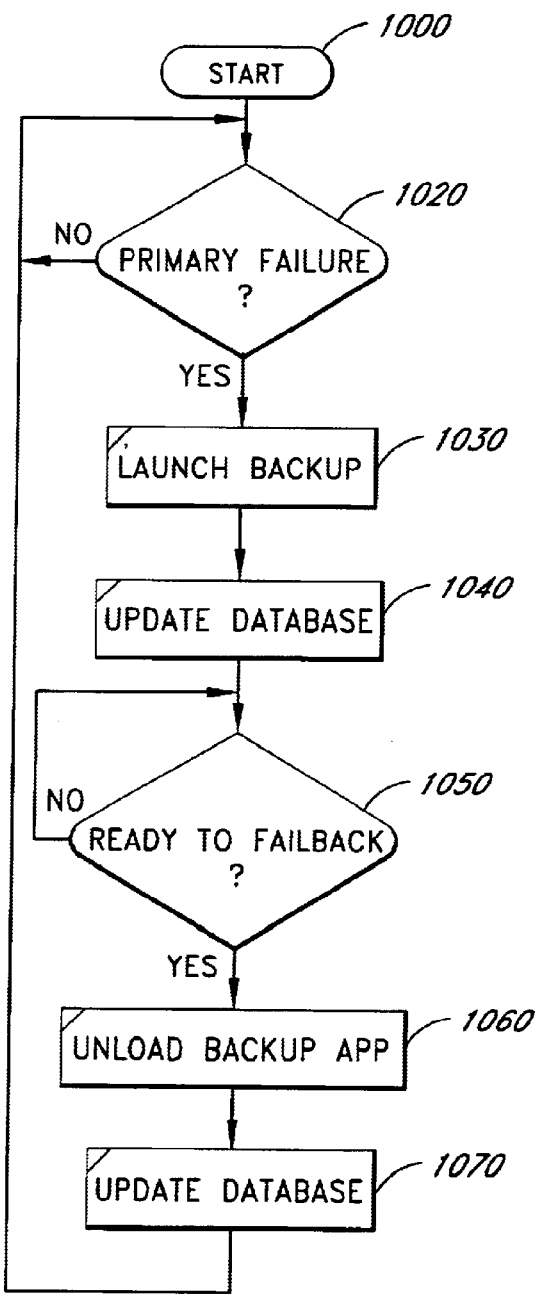
FIG. 9 illustrates a flowchart of one embodiment of a detection failover/failback process as seen by a backup server, in accordance with the invention.

Referring now to FIG. 9, a flowchart of the steps carried out by the backup server during a detect, failover and failback procedure executed by Netframe Cluster software is illustrated. The procedure starts at location 1000 and proceeds to step 1020 wherein the second server determines whether a primary server failure has been detected. The detection may be carried out by any one or combination of the detection methods discussed above, i.e., the LAN Heartbeat method and the Drive pulse method. In step 1020, the process keeps recursively monitoring for a primary server failure. If in step 1020 a primary server failure is detected, then in step 1030, the backup server loads and launches its version of the application program. The backup knows to execute the application because it knows that the primary has failed and therefore interrogates its replicated database to discover that an object corresponding to the application is in the active space of the directory which lists the primary server as the HOST and the backup as the BACKUP. After the backup has loaded and launched its version of the application program, in step 1040, Netframe Cluster software updates the database by changing the HOST attribute to indicate the backup server as the new host of the application. Therefore, all further access to the application by network clients/users will be through the backup server. In step 1050, the process queries whether the failback program, or module, should be initiated. The failback module is initiated when the primary server is back on-line. Therefore, part of the query of step 1050, is making a determination as to whether the primary is back on-line. This detection mechanism may be carried out as described above by sending NCP packets to primary server and waiting for an acknowledgment signal. If an acknowledgment signal is not returned within a specified period of time, it is determined that the primary server is still not operational.

If in step 1050, it is determined that the primary server is back on-line and the process is ready to enter the failback mode, then in step 1060, the backup server unloads the application. In step 1070, the Netframe Cluster software updates the database by changing the HOST attribute back to its original primary server ID value.

The foregoing description has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

Appendix A

Incorporation by Reference of Commonly Owned Applications

The following patent applications, commonly owned and filed Oct. 1, 1997, are hereby incorporated herein in their entirety by reference thereto:

| Title | Application No. | Patent No. | Attorney Docket No. |
|---|---|---|---|
| "System Architecture for Remote Access and Control of Environmental Management" | 08/942,160 | | MNFRAME.002A1 |
| "Method of Remote Access and Control of Environmental Management" | 80/942,215 | 6,189,109 | MNFRAME.002A2 |
| "System of Independent Powering of Diagnostic Process on a Computer System" | 08/942,410 | 6,202,160 | MNFRAME.002A3 |
| "Method of Independent Powering of Diagnostic Process on a Computer System" | 08/942,320 | 6,134,668 | MNFRAME.002A4 |
| "Diagnostic and Managing Distributed Processor System" | 08/942,402 | | MNFRAME.005A1 |
| "Method for Managing a Distributed Processor System" | 08/942,448 | | MNFRAME.005A2 |
| "System for Mapping Environmental Resources to Memory for Porgram Access" | 08/942,222 | 6,122,758 | MNFRAME.005A3 |
| "Method for Mapping Environmental Resources to Memory for Porgram Access" | 08/942,214 | 6,199,173 | MNFRAME.005A4 |
| "Hot Add of Devices Software Architecture" | 08/942,309 | | MNFRAME.006A1 |
| "Method for The Hot Add of Devices" | 08/942,306 | | MNFRAME.006A2 |
| "Hot Swap of Devices Software Architecture" | 08/942,311 | 6,192,434 | MNFRAME.006A3 |
| "Method for The Hot Swap of Devices" | 08/942,457 | | MNFRAME.006A4 |

-continued

| Title | Application No. | Patent No. | Attorney Docket No. |
|---|---|---|---|
| "Method for The Hot Add of a Network Adapter on a System Including a Dynamically Loaded Adapter Driver" | 08/943,072 | 5,892,928 | MNFRAME.006A5 |
| "Method for the Hot Add of a Mass Storage Adapter on a System Including a Statically Loaded Adapter Driver" | 08/942,069 | 6,219,734 | MNFRAME.006A6 |
| "Method for the Hot Add of a Network Adapter on a System Including a Statically Loaded Adapter Driver" | 08/942,465 | 6,202,111 | MNFRAME.006A7 |
| "Method for the Hot Add of a Mass Storage Adapter on a System Including a Dynamically Loaded Adapter Driver" | 08/962,963 | 6,179,486 | MNFRAME.006A8 |
| "Method for the Hot Swap of a Network Adapter on a System Including a Dynamically Loaded Adapter Driver" | 08/943,078 | 5,889,965 | MNFRAME.006A9 |
| "Method for the Hot Swap of a Mass Storage Adapter on a System Including a Statically Loaded Adapter Driver" | 08/942,336 | | MNFRAME.006A10 |
| "Method for the Hot Swap of a Network Adapter on a System Including a Statically Loaded Adapter Driver" | 08/942,459 | 6,170,028 | MNFRAME.006A11 |
| "Method for the Hot Swap of a Mass Storage Adapter on a System Including a Dynamically Loaded Adapter Driver" | 08/942,458 | 6,173,346 | MNFRAME.006A12 |
| "Method of Performing an Extensive Diagnostic Test in Conjunction with a BIOS Test Routine" | 08/942,463 | 6,035,420 | MNFRAME.008A |
| "Apparatus for Performing an Extensive Diagnostic Test in Conjunction with a BIOS Test Routine" | 08/942,163 | 6,009,541 | MNFRAME.009A |
| "Configuration Management Method for Hot Adding and Hot Replacing Devices" | 08/941,268 | 6,148,355 | MNFRAME.010A |
| "Configuration Management System for Hot Adding and Hot Replacing Devices" | 08/942,408 | 6,243,773 | MNFRAME.011A |
| "Apparatus for Interfacing Buses" | 08/942,382 | 6,182,180 | MNFRAME.012A |
| "Method for Interfacing Buses" | 08/942,413 | 5,987,554 | MNFRAME.013A |
| "Computer Fan Speed Control Device" | 08/942,447 | 5,990,582 | MNFRAME.016A |
| "Computer Fan Speed Control Method" | 08/942,216 | 5,962,933 | MNFRAME.017A |
| "System for Powering Up and Powering Down a Server" | 08/943,076 | 6,122,746 | MNFRAME.018A |
| "Method of Powering Up and Powering Down a Server" | 08/943,077 | 6,163,849 | MNFRAME.019A |
| "System for Resetting a Server" | 08/942,333 | 6,065,053 | MNFRAME.020A |
| "Method of Resetting a Server" | 08/942,405 | | MNFRAME.021A |
| "System for Displaying Flight Recorder" | 08/942,070 | 6,138,250 | MNFRAME.022A |
| "Method for Displaying Flight Recorder" | 08/942,068 | 6,073,255 | MNFRAME.023A |
| "Synchronous Communication Interface" | 08/943,355 | 6,219,711 | MNFRAME.024A |
| "Synchronous Communication Emulation" | 08/942,004 | 6,068,661 | MNFRAME.025A |
| "Software System Facilitating the Replacement or Insertion of Devices in a Computer System" | 08/942,317 | 6,134,615 | MNFRAME.026A |
| "Method for Facilitating the Replacement or Insertion of Devices in a Computer System" | 08/942,316 | 6,134,614 | MNFRAME.027A |
| "System Management Graphical User Interface" | 08/943,357 | | MNFRAME.028A |

-continued

| Title | Application No. | Patent No. | Attorney Docket No. |
|---|---|---|---|
| "Display of System Information" | 08/942,195 | 6,046,742 | MNFRAME.029A |
| "Data Management System Supporting Hot Plug Operations on a Computer" | 08/942,129 | 6,105,089 | MNFRAME.030A |
| "Data Management Method Supporting Hot Plug Operations on a Computer" | 08/942,124 | 6,058,445 | MNFRAME.031A |
| "Alert Configurator and Manager" | 08/942,005 | | MNFRAME.032A |
| "Managing Computer System Alerts" | 08/943,356 | | MNFRAME.033A |
| "Computer Fan Speed Control System" | 08/940,301 | | MNFRAME.034A |
| "Computer Fan Speed Control System Method" | 08/941,267 | | MNFRAME.035A |
| "Black Box Recorder for Information System Events" | 08/942,381 | | MNFRAME.036A |
| "Method of Recording Information System Events" | 08/942,164 | | MNFRAME.037A |
| "Method for Automatically Reporting a System Failure in a Server" | 08/942,168 | 6,243,838 | MNFRAME.040A |
| "System for Automatically Reporting a System Failure in a Server" | 08/942,384 | 6,170,367 | MNFRAME.041A |
| "Expansion of PCI Bus Loading Capacity" | 08/942,404 | | MNFRAME.042A |
| "Method for Expanding PCI Bus Loading Capacity" | 08/942,223 | 6,195,717 | MNFRAME.043A |
| "System for Displaying System Status" | 08/942,347 | 6,145,098 | MNFRAME.044A |
| "Method for Displaying System Status" | 08/942,071 | 6,088,816 | MNFRAME.045A |
| "Fault Tolerant Computer System" | 08/942,194 | 6,175,490 | MNFRAME.046A |
| "Method for Hot Swapping of Network Components" | 08/943,044 | | MNFRAME.047A |
| "A Method for Communicating a Software Generated Pulse Waveform Between Two Servers in a Network" | 08/942,221 | 6,163,853 | MNFRAME.048A |
| "A System for Communicating a Software Generated Pulse Waveform Between Two Servers in a Network" | 08/942,409 | | MNFRAME.049A |
| "Method for Clustering Software Applications" | 08/942,318 | 6,134,673 | MNFRAME.050A |
| "System for Clustering Software Applications" | 08/942,411 | | MNFRAME.051A |
| "Method for Automatically Configuring a Server after Hot Add of a Device" | 08/942,319 | 6,212,585 | MNFRAME.052A |
| "System for Automatically Configuring a Server after Hot Add of a Device" | 08/942,331 | | MNFRAME.053A |
| "Method of Automatically Configuring and Formatting a Computer System and Installing Software" | 08/942,412 | 6,154,835 | MNFRAME.054A |
| "System of Automatically Configuring and Formatting a Computer System and Installing Software" | 08/941,955 | 6,138,179 | MNFRAME.055A |
| "Determining Slot Numbers in a Computer" | 08/942,462 | | MNFRAME.056A |
| "System for Detecting Errors in a Network" | 08/942,169 | | MNFRAME.058A |
| "Method for Detecting Errors in a Network" | 08/940,302 | | MNFRAME.059A |
| "System for Detecting Network Errors" | 08/942,407 | | MNFRAME.060A |
| "Method for Detecting Network Errors" | 08/942,573 | | MNFRAME.061A |

Appendix B

NetWare ClusterData

Functional Specification

Rev 1.1, May 22, 1996

Dino Delyani
Gary Figgins
Bruce Findlay
Tom Pellicer

NetWare ClusterDat... ctional Spec                                                           5/6/97

PURPOSE/SCOPE ........................................................................................................................... 3

INTRODUCTION ........................................................................................................................... 3

OVERVIEW ..................................................................................................................................... 4

SUPPORTED PLATFORMS ......................................................................................................... 6
   HARDWARE ...................................................................................................................................... 6
   OPERATING SYSTEMS ...................................................................................................................... 6
   CLIENT SOFTWARE .......................................................................................................................... 6

COMPONENTS ............................................................................................................................... 6
   MANAGEMENT TOOLS ..................................................................................................................... 7
      *Configurator* ............................................................................................................................. 7
      *Installer* .................................................................................................................................... 8
   MIDDLEWARE .................................................................................................................................. 8
      *Heartbeat monitor* .................................................................................................................. 8
      *Spoof Manager* ....................................................................................................................... 9
      *Switch Manager* ..................................................................................................................... 9
      *Segment Agent and Device Agent* .......................................................................................... 9
   NETWORK INTERFACE MODULES ..................................................................................................... 9
      *NDS manager* ......................................................................................................................... 9
      *Dual Initiator Driver* ............................................................................................................ 10

PHASES OF DEVELOPMENT .................................................................................................... 10

REVISION 2 (FIRST RELEASED VERSION) ............................................................................................ 10

LIMITATIONS .............................................................................................................................. 11

APPENDIX ..................................................................................................................................... 13
   NDS VOLUME ATTRIBUTES ADDED FOR CLUSTERDATA ................................................................. 13
   REVISION 0 IMPLEMENTATION ....................................................................................................... 13
   REVISION 1 IMPLEMENTATION ....................................................................................................... 15

NetWare ClusterDat. .ctional Spec　　　　　　　　　　　　　　　　　　　　　　　　　5/6/97

Purpose/Scope

This document provides an explanation of the functionality and a high level description of the implementation of NetFRAME's NetWare ClusterData solution. This Functional Specification is meant to serve the following purposes:

- To provide a detailed functional description of the product. Marketing will use this document to fully understand the features and limitations of NetWare ClusterData as presently envisioned, and to be able to determine by reading this document if our current plans will meet customer needs and constitute a value added NetFRAME feature.

- To provide a starting point for developers who wish to maintain or modify the product. While it is not feasible to include in this document every technical problem which will be faced in the implementation of ClusterData, the document should give a developer an idea of the interfaces among the various software components of the product and give a general view of the mechanisms that will make NetWare ClusterData work.

- To provide a "roadmap" of the planned implementation steps of NetWare ClusterData. While the development team would like to have a "full" implementation of the product as soon as possible, it has become apparent during the research portion of this project that, in order for development to proceed in the absence of the resolution of all technical hurdles, a phased approach should be pursued. The goal of this approach is to move toward the completion of a full solution with demonstrable milestones along the way while limiting the amount of "throw-away" code.

Introduction

The NetWare ClusterData is middleware-based fault tolerance solution which leverages NetWare Directory Services (NDS) and client autoreconnect to seamlessly redirect data requests from a failed to a backup server while maintaining all client connections. This solution will put NetFRAME in a position of leadership in the clustered fault-tolerance arena and will position the company well when more complete, shared memory based solutions are available.

The main service provided by ClusterData is a redundant data path through a server which does not need to be a dedicated backup server; i.e., that server can be used for purposes other than a standby. This, we believe, presents an obvious advantage over SFT-III in that, in the usual case, both servers are doing useful work - but when the primary fails over to the backup, overall system, performance/availability degrade in a graceful fashion.

This product aims to remove the Network Operating System as a point of failure between a client and its network based data. Note, however, that this implementation only clusters NetWare volumes. While future implementations may attempt to seek printers, applications, or other network resources, this project is currently limited to "data"; hence its name.

NetWare ClusterData ctional Spec 5/6/97

Overview

This product will allow for the configuration of NetWare volumes into "clusters" whereby the disks are connected to two servers, one of which functions as the "primary" and the other as the "secondary" path to the disk farm (data). The secondary monitors the primary, and in the case of a failure, modifies NDS and notifies the disk driver to cause the volume to be accessed by the clients via the secondary path.

Implementation of this product requires Novell Client 32 software, server software (NLMs) which communicate with NDS and a configurator which allows the definition of volume "clusters." While the architecture allows for an "open" mode of connecting a disk to two servers, the initial implementation of the product will accomplish this via the backend technology of dual initiator SCSI drivers (requiring NetFRAME modification). On the CS9000 this driver will be based on the source code provided by QLogic, NetFRAME's vendor of choice for that machine's SCSI adapter, while on the NF 8500, modifications to NFHAM and the IOP2 firmware will be necessary.

When an NLM on the secondary server detects that the primary has stopped functioning, NDS is interrogated to determine if any volumes on the "down" server can have their ownership transferred to a backup server. If that is the case, a series of events is initiated to cause, without the knowledge of the client, the secondary server to mount the volume. At this point one of two things can happen:

1. The client software will reconnect to lost volumes through NDS, or

2. The secondary will "spoof" the dead primary server such that the loss of the data path is invisible to the connected clients.

Both options require some support from Novell. However, option (1) is clearly preferred, as it a conceptually much simpler solution and requires no "dirty hooks" into NetWare.

In either case, the secondary server will be required to have available RAM to accommodate the data structures that will be allocated as a result of the volume(s) being mounted. Also, in all cases the "failover latency" is constrained by the time it takes to mount a volume, which may be significant, particularly if the volume was damaged as a result of the primary server's failure.

Following a failover, once the primary server has been restored, the System Administrator will be provided with an interface to cause a "fail-back" which, from the point of view of the ClusterData middleware, is just another failover.

The following two diagrams show an idealized ClusterData configuration using NetFRAME CS9000's and SCSI switches. The first diagram shows the cluster prior to a failover. Each SCSI switch has two connections, a live connection, indicated by a solid line, and a backup connection, depicted by a broken line. If the primary connection fails due to a server failure such as an abend, the backup connection will be activated. In the example formed by the two diagrams, the "toggling" of the switch would be accomplished via a message from the backup server - which detected the failure via a LAN-based "heartbeat" - to the SCSI switch.

Therefore, if a failure occurs, for example, at the server at "12:00" in the diagrams, that server's connection will be picked up by the servers at 3:00 and 9:00, as indicated in the second diagram. With proper client software, the workstations connected to the down server will seamlessly reconnect to the lost volumes after they have been remounted on the backup servers.

NetWare ClusterData Funct    Spec                                   5/6/97
Cluster Prior To Failover
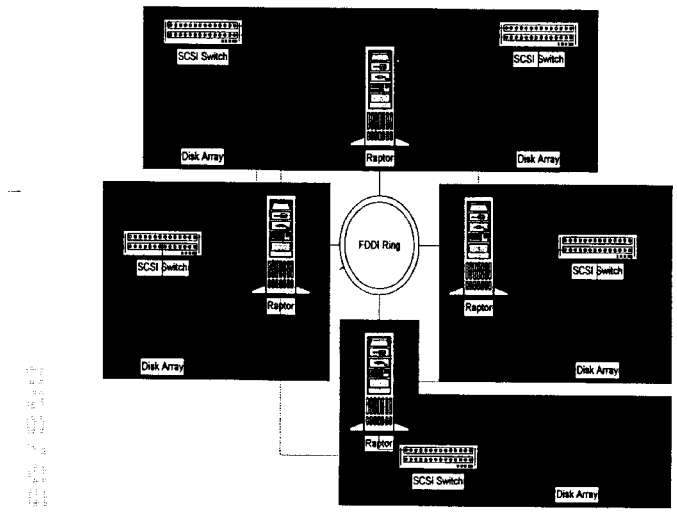
Cluster Following Failover
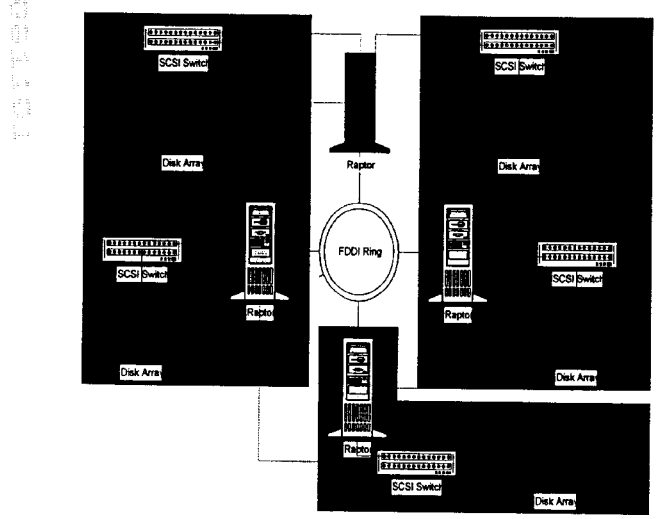

NetWare ClusterData ctional Spec                                  5/6/97

Supported Platforms

Hardware
- NetFRAME CS9000
- NetFRAME 8500 (IOP2T/IOP2E)

Operating Systems
- NetWare 4.10
- NetWare 4.10 SMP
- NetWare 4.11 (Green River)

Client Software

It is highly desirable that there be no NetFRAME supplied client software necessary for ClusterData to work. However, the client must support autoreconnect; i.e., the client should reconnect with a down server after that server (or another spoofing it) has reappeared after any service interruption. The following table survey's our knowledge of various client types and their autoreconnect support:

| | |
|---|---|
| Windows 95 | Supports Autoreconnect |
| Windows NT | Autoreconnect support in Beta |
| Windows 3.1 | Autoreconnect support in Beta |
| DOS (native) | Autoreconnect support in Beta |
| UNIX | Supports Autoreconnect (due to stateless NFS) |
| Macintosh | Autoreconnect support in Beta |

Components

ClusterData consists of a large number of software pieces which are grouped into four categories for ease of explanation:

1. Management Tools, which are client-based GUI applications which need not be running as part of a switchover in disk ownership from the primary to the secondary servers, 2. Middleware, which is resident on the secondary server and detects the primary failure and executes the switch-over, 3. Network Interface Modules, which interface to NDS and the physical network. This implies that only NetWare 4.1 servers may use ClusterData, and 4. Backend Support Modules, which provide for redundant data paths. Initially, this will be implemented as dual initiator SCSI.

NetFRAME Confidential

NetWare ClusterData tional Spec  5/6/97

The following diagram shows the intended relationship of the components to each other, and

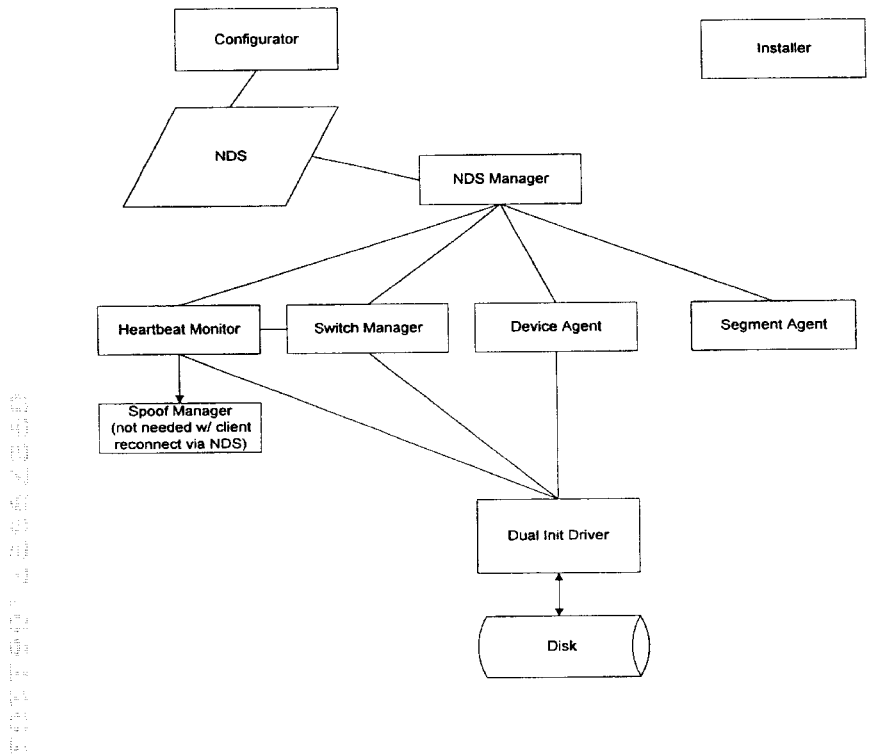

Again, note well that clients which do not have autoreconnect support must be rebooted in order to access a volume should the server on which the volume is mounted crashes.

*Management Tools*

Configurator

The Configurator is a GUI-based 32-bit client application which allows the declaration of primary and secondary volumes such that the SysAdmin can create data clusters, i.e., more than one server path to a volume. It will be executable from Windows 95 and NT 4.0 clients. This utility will display information based on the volume attributes resident in NDS. Because this an NDS-based application, users must "authenticate" before the Configurator can be used. Note that clusters can only be created in cases where the physical configuration of the two subject servers and the disks implementing a particular volume make it possible to do so. The information supplied to the configurator regarding the physical connectivity is stored in NDS and is built by the Segment Agent.

The following is a preliminary example of a Configurator screen. The Configurator is still under development and that the final product may or may not resemble this "screen shot."

NetWare ClusterDat    ctional Spec                                                          5/6/97

| Primary Object | Type | Status | Backup Object | Type | Status |
|---|---|---|---|---|---|
| RIGHT_CONGO | VOL | ACTIVE | LEFT_CONGO | VOL | IDLE |
| EXPLORER_003 | VOL | IDLE | WINTERMUTE | VOL | ACTIVE |
| SERVER001 | VOL | ACTIVE | LEFT_CONGO | VOL | IDLE |
| MILO_MAIN | VOL | ACTIVE | MILO_BACK | VOL | IDLE |
| RIGHT_MAIN | VOL | DOWN | AAA1234_000X | VOL | ACTIVE |

Note that the only clusterable objects are volumes. Clusters are defined as servers dually connected to SCSI chains. There is no notion here of the clustering of objects such as printers or applications.

As determined by Customer Support and Marketing, we may implement the limitation that a SysAdmin may not cluster an existing volume and provide a "key" that would limit some management functions to authorized users, i.e., NetFRAME support personnel, only. Also, we are investigating more state-of-the-art management features for the Configurator, such as a Wizard.

Installer

The Installer is a nice-to-have piece of software which distributes all the server based software (Middleware and External Interface Software) to all desired servers in a network. This will be done only if the schedule allows. Also, third party solutions that perform this function may be appropriate for this component.

Middleware

Heartbeat monitor

The Heartbeat Monitor runs on the secondary server of a cluster and monitors the status of the primary server, and in the event it determines that the primary is dead, takes the following steps:

- Starts the spoof manager so that the clients "think" that the primary is still responding. As noted in Phases of Development it is hoped that NDS-volume-aware client software will make the Spoof Manager obsolete.

- Alerts the Switch Manager that a switch is to occur.

- Mounts the volumes being switched-over on the secondary server(s).

- Updates NDS (through the NDS Manager) to indicate that secondary server is now the path through which volumes which previously were connected via the "down" server are now being accessed.

Spoof Manager

It is highly desired that this component be unnecessary. In the absence of client autoreconnection, the backup server must advertise itself as both the backup and primary servers. The IPX internal address, network address, server name, and MAC address must be "spoofed" in order to make the client "believe" that the primary server is back on-line. The specific way in which this will be accomplished is unknown and likely could not be accomplished without support from Novell engineering. Note that this software will not be needed if the client software maintains mappings as NDS volume objects, and when a server fails, the clients try to reestablish the lost mappings by querying for the host server attribute of the "lost" volume object.

Switch Manager

The Switch Manager is currently envisioned as a software layer that abstracts the switchover interface in the dual initiator driver. While not strictly necessary, this component will allow for a smooth transition to other drivers/agents which would interface with the shared bus.

Segment Agent and Device Agent

The Segment Agent and the Device Agent work in concert to determine which volumes are "clusterable" in a network. This information is used by the Configurator when displaying volume "clusterability." This code will ascertain the mapping of disk to volume segments, and, in turn, to volumes, and thus be able to deem a given NetWare volume as clusterable or otherwise. The Segment Agent determines which volume segments are on "legal" physical drives by communicating with the Device Agent, which is responsible for physical drives.

Network Interface Modules

NDS manager

This component is used by all other server-based components (i.e., all but the Configurator) to communicate with NDS. It serves as a central module which handles all NDS reads and writes from the following modules:

- Heartbeat
- Switch manager
- Segment Agent
- Device Agent

The motivation behind the NDS manager is to allow easy migration of the other components to a database other than NDS. Also any NDS updates would occur only in this component, thus allowing the other modules to simply make generic calls to exported routines from the NDS manager.

In order to accommodate the information necessary to make NetWare ClusterData possible, several attributes were added to NDS Volume Objects. These attributes are listed in the Appendix.

NetWare ClusterData Functic    pe⌣                                             5/6/97

*Backend Support Modules*

Dual Initiator Driver

In the first implementation of ClusterData, enhancements to the SCSI driver will provide the basic fault-tolerance pathway. It is anticipated that on top of the driver will sit a bit of synchronization code that will be arbitrating for a given SCSI bus. When instructed, either driver connected to a SCSI string is capable of establishing communication/control over all the disks attached to the heretofore "quiet" card.

Phases of Development

As the development and research of this project has moved forward, it has become clear that a phased approach would be the most appropriate path toward a product release. There have been two major technical challenges to an "ideal" implementation that appear to require third party assistance. This has led us to believe that it might be wise to implement "what we can do" at a given time rather than waiting for that assistance. The stumbling blocks are:

- Ability to spoof the server without the backup server losing its previously connected clients
- Client reconnection As a result, we originally proposed three "revisions" of NetWare ClusterData, summarized as follows:

- Rev 0: Dedicated Backup. At failover, boot backup server and load driver. This revision will not pursued. This form of the product is described in the Appendix.
- Rev 1: Non-dedicated backup with spoofing. At failover, backup will retain its old internal IPX and MAC addresses, while also broadcasting those of the down server. It is highly desirable that we implement this solution only as a milestone or for demonstration purposes, as spoofing has several limitations and is unproven. This form of the product is also described in the Appendix.
- Rev 2: Non-dedicated backup without spoofing. Have clients reconnect to a lost volume through NDS. No spoofing required. This is the desired implementation method. A more detailed description follows.

*Revision 2 (First Released Version)*

In the initial external release of the product, the client will have the ability to find a lost volume through NDS, thus making spoofing unnecessary. Note that this is dependent on Client 32 functionality which does not currently exist and requires development by Novell. This will allow the backup server to be non-dedicated, i.e., to be a fully functional server while monitoring the status of the primary. As previously stated, this version of the product will implement modifications to the SCSI driver that will involve synchronized arbitration for a SCSI bus. When the failover occurs, the driver on the secondary server will be alerted by the Switch Manager, and the driver will "take over" the bus after ensuring that the primary driver is no longer communicating over the bus.

One consideration of which users must be aware, however, is that the backup server must have sufficient resources, connections and RAM, primarily, to be able to support the volume and client needs of one or more primaries. The following diagram shows two possible topologies for Revision 2 configurations.

NetWare ClusterData :tional Spec 5/6/97

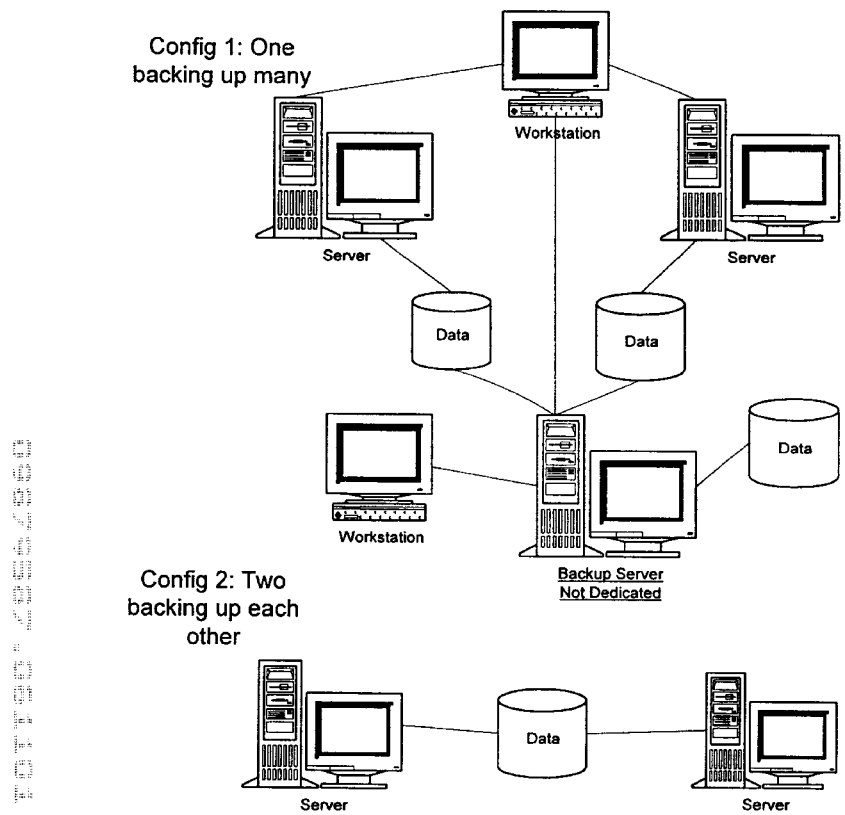

Config 1: One backing up many

Config 2: Two backing up each other

Backup Server
Not Dedicated

Limitations

- This is a LAN product only.
- Licenses on backup servers must be large enough to accommodate all users that will be inherited from failed servers.
- Backup servers must have sufficient resources to mount inherited volumes.
- Only SCSI II disk drives will be supported.
- As currently envisioned, there is no application failover feature in the product.
- All name spaces and file access products (e.g., NFS, AFP) must be preloaded on the both the primary and backup servers.
- Mac clients are only supported for IPX.

NetWare ClusterDa.  .actional Spec  5/6/97

- As currently understood, the failover latency will be a function of the following values, and may be significant:
    - Heartbeat failure detection.
    - Bus reset (if necessary)
    - Volume mount, including possible VREPAIR
    - NDS propagation
    - Client reconnection latency

Futures

- Switchover for adapter failures for disks only attached to failed adapters. A failover would be initiated by a primary server upon detection of controller failure.
- Simultaneous volume mounts. This would be nice to have from Novell, but is out of our control.

NetWare ClusterDa.    .ictional Spec                                                        5/6/97

Appendix

NDS Volume Attributes Added for ClusterData

- Primary Server (character string)
- Backup Servers (array of character strings, allows for future definition of multiple backup servers)
- Cluster Capable (Boolean)
- Cluster Enabled (Boolean)
- Current state (integer)
- Previous state (integer)
    - Valid states
    - 1 - No failovers; disk OK
    - 2 - Successful failover completed
    - 3 - Unsuccessful failover completed
    - (further codes to be defined as needed)

Revision 0 Implementation

In its simplest (crudest?) implementation, NetWare ClusterData requires a dedicated backup server. When the backup has detected that the primary is dead, it "spoofs" the identity of the primary by adopting the primary's internal IPX and MAC addresses without regard to its own existing clients, because it has none. Meanwhile, the primary's former clients are unaware of the deception. Cool. Unfortunately, we have encountered difficulties programmatically modifying internal IPX and MAC addresses while a server is running. Not cool, and hence the suggestion of a hot standby. While reverse engineering is in progress to determine how this might be accomplished, it is uncertain as to how it will be done.

The current plan, which may be useful only as a prototype or for test purposes, is to hold the backup server in a state where it is awaiting internal IPX address and server name input, which occurs at NetWare boot time - specifically during the execution of the autoexec.ncf. As a result, the heartbeat must run as a .DSK loaded in the startup.ncf, which is executed prior to the autoexec.ncf. When the heartbeat detects a down server, it will stuff the keyboard buffer and then continue to boot, eventually loading the disk driver and executing a "mount all," which will include the mounting of the dually attached (i.e., clutsered) volumes. Note that keeping NDS up-to-date is a problem in this scheme. The only currently known way to keep NDS current on the backup server is to periodically execute the autoexec, load NDS, and reboot.

Also, because the driver will not be loaded at switchover time, a serial link will be necessary to implement the heartbeat. This serial link will be the mechanism through which the Heartbeat Manager will "know" the names and internal IPX addresses of the servers under its watch. Because of a presumed small number of serial connections on a backup server, the serial link will be a ring through the configuration. If any servers are lost along the ring, all surviving servers will have to adjust their participation in the heartbeat "token" passing scheme accordingly. The implementation details of this scheme are under development. The following diagram shows two possible configurations of NetWare ClusterData Rev.0, a one-to-one backup configuration and a one-to-many configuration.

NetFRAME Confidential               13

NetWare ClusterDa᎘ ᠉ctional Spec
**Configuration 1:
One backing up one**
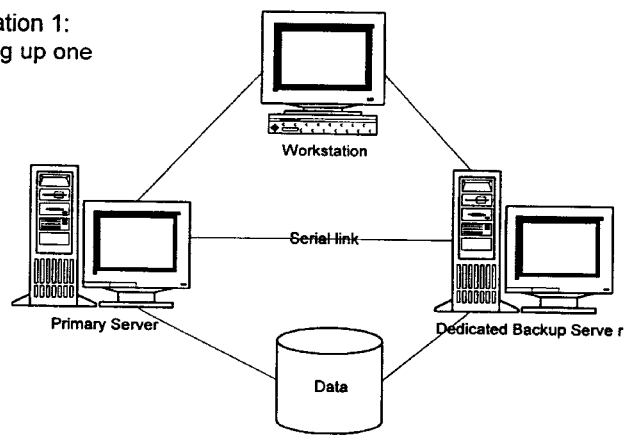
Configuration 2: One backing up many
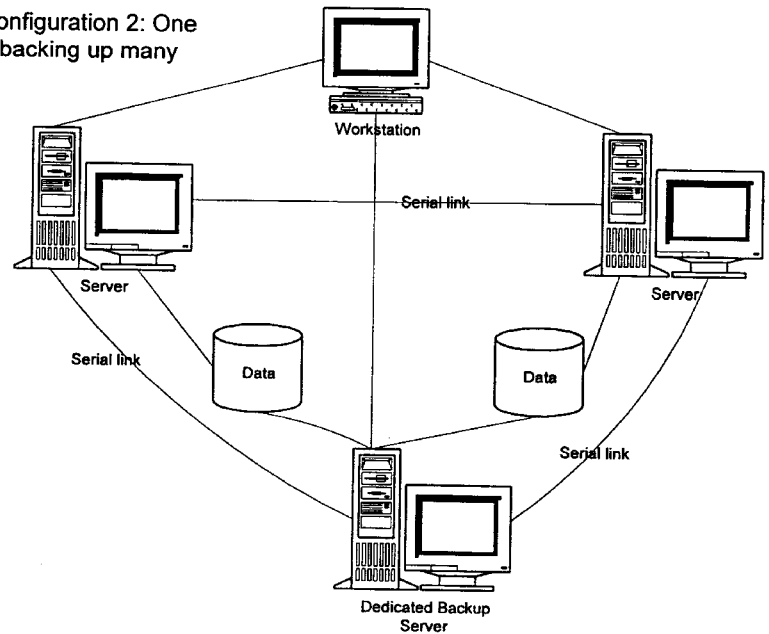

NetWare ClusterDat  :ctional Spec  5/6/97

Revision 1 Implementation

The implementation of revision 1 of NetWare ClusterData calls for the secondary server to spoof the internal IPX and MAC addresses of the down server while maintaining its old addresses. This will require updates to the Switch Manager which have been under investigation.

What is claimed is:

1. A system of loading and registering a software program in a cluster network database, coupled to a first server and a second server in a server network, comprising:
 a primary load module which loads the program in the first server;
 a preregistration module which determines if the program was previously registered;
 an object module which creates an object for the program and stores the object in the database, if it is determined that the program was not previously registered;
 a nonfailure module which determines if a system operator previously unloaded the program;
 a phoenix detect module which determines if the first server is coming back from a failback process, if it is determined that the system operator did not previously unload the program; and
 a synchronization module which synchronizes all replicated databases within the network, if it is determined that the first server is not coming back from failback process.

2. The system of claim 1 wherein the preregistration module comprises a search module which searches for an object in an archive file of the database which contains a tag attribute corresponding to the program and a primary server attribute corresponding to the first server.

3. The system of claim 1 wherein the nonfailure module comprises a host status module which reads a host server attribute within an object corresponding to the program and determines whether the host server attribute is set to a null value.

4. The system of claim 1 wherein the phoenix detect module comprises a read module which reads a host server attribute within an object corresponding to the program and determines if the host server attribute indicates that the second server is the host server.

5. A system of loading and registering a software program in a cluster network database, coupled to a first server and a second server in a server network, comprising:
 a primary load module which loads the program in the first server;
 a preregistration module which determines if the program was previously registered;
 an object module which creates an object for the program and stores the object in the database, if it is determined that the program was not previously registered;
 a phoenix detect module which determines if the first server is coming back from a failback process; and
 a synchronization module which synchronizes all replicated databases within the network, if it is determined that the first server is not coming back from failback process.

6. The system of claim 5 wherein the preregistration module comprises a search module which searches for an object in an archive file of the database which contains a tag attribute corresponding to the program and a primary server attribute corresponding to the first server.

7. The system of claim 5 wherein the phoenix detect module comprises a read module which reads a host server attribute within an object corresponding to the program and determines if the host server attribute indicates that the second server is the host server.

8. A method of providing fault tolerant execution of an application program in a server network having a first and second server, comprising:

executing the application program in the first server;
 detecting a failure of the first server; and
 executing the application program in the second server upon detection of the failure of the first server;
 detecting a correction of the failure of the first server;
 unloading the application program from the second server; and
 re-executing the application program in the first server.

9. The method of claim 8, wherein detecting a failure comprises:
 monitoring communications between the first server and a network resource; and
 detecting a termination in the communication between the first server and the network resource.

10. The method of claim 9, wherein detecting a failure comprises:
 successively transmitting first and second command signals from the first server to a device coupled to the first server, wherein the first command signal places the device in a first status condition and the second command signal places the device in a second status condition; and
 monitoring a status condition of the device with the second server, coupled to the device, wherein a change in the status condition of the device indicates that the first server is operational and a constant status condition indicates the failure of the first server.

11. A system for providing fault tolerant execution of an application program in a server network having a first and second server, comprising:
 means for executing the application program in the first server;
 means for detecting a failure of the first server; and
 means for executing the application program in the second server upon detection of the failure of the first server;
 means for detecting a correction of the failure of the first server;
 means for unloading the application program from the second server; and
 means for re-executing the application program in the first server.

12. The system of claim 11, wherein detecting a failure comprises:
 means for monitoring communications between the first server and a network resource; and
 means for detecting a termination in the communication between the first server and the network resource.

13. The system of claim 11, wherein detecting a failure comprises:
 means for successively transmitting first and second command signals from the first server to a device coupled to the first server, wherein the first command signal places the device in a first status condition and the second command signal places the device in a second status condition; and
 means for monitoring a status condition of the device with the second server, coupled to the device, wherein a change in the status condition of the device indicates that the first server is operational and a constant status condition indicates the failure of the first server.

* * * * *